(12) United States Patent
Ham et al.

(10) Patent No.: US 12,292,838 B2
(45) Date of Patent: *May 6, 2025

(54) HOST DEVICE PERFORMING NEAR DATA PROCESSING FUNCTION AND ACCELERATOR SYSTEM INCLUDING THE SAME

(71) Applicants: SK Hynix Inc., Icheon (KR); POSTECH ACADEMY—INDUSTRY FOUNDATION, Pohang (KR)

(72) Inventors: Hyungkyu Ham, Pohang (KR); Hyunuk Cho, Incheon (KR); Hyojin Sung, Pohang (KR); Eunhyeok Park, Pohang (KR); Gwangsun Kim, Pohang (KR)

(73) Assignees: SK Hynix Inc., Icheon (KR); POSTECH ACADEMY-INDUSTRY FOUNDATION, Pohang (KR)

( * ) Notice: Subject to any disclaimer, the term of this patent is extended or adjusted under 35 U.S.C. 154(b) by 113 days.

This patent is subject to a terminal disclaimer.

(21) Appl. No.: 18/066,161

(22) Filed: Dec. 14, 2022

(65) Prior Publication Data

US 2023/0195651 A1 Jun. 22, 2023

(30) Foreign Application Priority Data

Dec. 22, 2021 (KR) .................. 10-2021-0184439
Oct. 24, 2022 (KR) .................. 10-2022-0137080

(51) Int. Cl.
*G06F 12/1081* (2016.01)
*G06F 12/123* (2016.01)

(52) U.S. Cl.
CPC ........ *G06F 12/1081* (2013.01); *G06F 12/125* (2013.01)

(58) Field of Classification Search
CPC ............... G06F 12/1081; G06F 12/125; G06F 15/7821; G06F 13/1668; G06F 13/1621;
(Continued)

(56) References Cited

U.S. PATENT DOCUMENTS 7,623,134 B1 11/2009 Danilak
11,468,001 B1* 10/2022 Hassaan .............. G06F 15/7821
(Continued)

FOREIGN PATENT DOCUMENTS

KR 1020190018888 A 2/2019
KR 1020200018188 A 2/2020

OTHER PUBLICATIONS

Ham et al. "Near-Data Processing in Memory Expander for DNN Acceleration on GPUs," IEEE Computer Architecture Letters, vol. 20, No. 2, Jul.-Dec. 2021 (Year: 2021).*
(Continued)

*Primary Examiner* — Michael Krofcheck

(57) ABSTRACT

A host device includes a unit processor configured to generate a near data processing (NDP) request, a host expansion control circuit configured to receive the NDP request; and a local memory device configured to store data corresponding to the NDP request according to control by the expansion control circuit. In response to receiving the NDP request, the host expansion control circuit performs a request processing operation to perform a read or a write operation corresponding to the NDP request on the local memory device and performs a computation operation using the requested data corresponding to the NDP request.

14 Claims, 15 Drawing Sheets

(58) Field of Classification Search
CPC ... G06F 13/4022; G06F 13/1673; G06F 13/28
See application file for complete search history.

(56) References Cited

U.S. PATENT DOCUMENTS

| | | | |
|---|---|---|---|
| 2021/0117131 A1 | 4/2021 | Kim et al. | |
| 2021/0311739 A1 | 10/2021 | Malladi et al. | |
| 2021/0349837 A1 | 11/2021 | Huangfu et al. | |
| 2023/0026505 A1* | 1/2023 | Lee | G06F 3/0679 |
| 2023/0195459 A1* | 6/2023 | Puthoor | G06F 9/30043 |
| | | | 712/225 |

OTHER PUBLICATIONS

D. Amodei et al., "Ai and compute", https://openai.com/blog/ai-and-compute, 2018.
S. Iofee et al., "Batch normalization: Accelerating deep network training by reducing internal covariate shift," in Proceedings of the 32nd International Conference on Machine Learning, ser. Proceedings of Machine Learning Research, vol. 37, 2015.
"Compute Express Link Specification 2.0," CXL Consortium, 2020, https://www.computeexpresslink.org/download-the-specification, Oct. 2020.
"An Introduction to CCIX White Paper," CCIX Consortium Inc, https://www.ccixconsortium.com/wp-content/uploads/2019/11/CCIX-White-Paper-Rev111219.pdf, 2019.
M. Krause et al., "Gen-Z DRAM and Persistent Memory Theory of Operation," Gen-Z Consortium, 2019.
K. He et al., "Deep residual learning for image recognition," in IEEE Conference on Computer Vision and Pattern Recognition (CVPR), 2016.
M. Sandler et al., "Mobilenetv2: Inverted residuals and linear bottlenecks," in Proceedings of the IEEE Conference on Computer Vision and Pattern Recognition (CVPR), Jun. 2018.
Y. Kwon et al., "TensorDIMM: A practical near memory processing architecture for embeddings and tensor operations in deep learning," in Proceedings of the 52nd Annual IEEE/ACM International Symposium on Microarchitecture, 2019, p. 740-753.
L. Ke et al., "RecNMPp: Accelerating personalized recommendation with near-memory processing," in Proceedings of the ACM/IEEE 47th Annual International Symposium on Computer Architecture, ser. ISCA '20, 2020, p. 790-803.
M. He et al., "Newton: A dram-maker's accelerator-in-memory (aim) architecture for machine learning," in 53rd Annual IEEE/ACM International Symposium on Microarchitecture, 2020.
S. Lee et al., "Hardware architecture and software stack for PIM based on commercial dram technology," in Proc. ACM/IEEE 48th Annu. Int. Symp. Comput. Archit., 2021, pp. 43-56.
Nvidia, "Convolutional layers user guide," Nvidia Docs, https://docs.nvidia.com/deeplearning/performance/dl-performanceconvolutional/index.html, 2021.
M. Khairy, et al., "Accel-sim: An extensible simulation framework for validated gpu modeling," in ACM/IEEE 47th Annual International Symposium on Computer Architecture (ISCA), 2020, pp. 473-486.
Y. Kim et al., "Ramulator: A fast and extensible dram simulator," IEEE Computer Architecture Letters, vol. 15, No. 1,pp. 45-49, 2016.
K. Simonyan et al., "Very deep convolutional networks for large-scale image recognition," ICLR, 2015.
N. Muralimanohar et al., "Cacti 6.0: A tool to model large caches," HP laboratories, vol. 27, Apr. 2009.
M. Hibben, "TSMC, not intel, has the lead in semiconductor processes," https://seekingalpha.com/article/4151376-tsmc-not-intel-lead-in-semiconductor-processes, 2018.
S. Mach et al., "FPnew: An open-source multiformat floating-point unit architecture for energy proportional transprecision computing," IEEE Transactions on Very Large Scale Integration (VLSI) Systems, vol. 29, No. 04, pp. 774-787, Apr. 2021.

C. Sun et al., "DSENT—A tool connecting emerging photonics with electronics for opto-electronic networks-on-chip modeling," IEEE/ACM Sixth International Symposium on Networks-on-Chip, 2012.
R. Hwang et al., "Centaur: A chiplet-based, hybrid sparse-dense accelerator for personalized recommendations," in Proc. ACM/IEEE 47th Annu. Int. Symp. Comput. Archit., 2020, pp. 968-981.
Y. Kwon et al., "Beyond the memory wall: A case for memory centric hpc system for deep learning," in Proceedings of the 51stAnnual IEEE/ACM International Symposium on Microarchitecture, ser. MICRO-51. IEEE Press, 2018, p. 148-161.
E. Choukse et al., "Buddy compression: Enabling larger memory for deep learning and hpc workloads on gpus," ACM/IEEE47th Annual International Symposium on Computer Architecture, 2020.
"NCCL Tests", https://github.com/NVIDIA/nccl-tests, 2016.
"XLA: Optimizing compiler for machine learning", https://www.tensorflow.org/xla, Nov. 2020.
"Nvidia nvlink high-speed interconnect: Application performance", Nvidia Whitepaper, 2014.
"OpenCAPI overview," OpenCAPI Consortium, 2016.
N. Gebara et al., "In-network aggregation for shared machine learning clusters," in Proceedings of Machine Learning and Systems, vol. 3, 2021, pp. 829-844.
"Introducing AMD CDNA architecture," AMD whitepaper, 2020.
"Nvidia DGX A100 System Architecture," Nvidia Technical WhitePaper, 2020.
"Nvidia data center deep learning product performance", https://developer.nvidia.com/deep-learning-performance-training-inference, Dec. 2021.
M. Abadi et al., "TensorFlow: A system for large-scale machine learning," in 12thUSENIX Symposium on Operating Systems Design and Implementation (OSDI 16). Savannah, GA: USENIX Association, Nov. 2016, pp. 265-283.
M. Andersch et al., "Tensor Core DL Performance Guide," Nvidia GPU Technology Conference, 2019.
B. Asgari et al., FAFNIR: Accelerating sparse gathering by using efficient near-memory intelligent reduction, in IEEE International Symposium on High Performance Computer Architecture (HPCA), 2021, pp. 908-920.
L. J. Ba et al.,"Layer normalization," CoRR, vol. abs/1607.06450, 2016.
T. Brown et al., "Language models are few-shot learners," in Advances in Neural Information Processing Systems, vol. 33.Curran Associates, Inc., 2020, pp. 1877-1901.
M. Caron et al., "Unsupervised learning of visual features by contrasting cluster assignments," in Advances in Neural Information Processing Systems, vol. 33. Curran Associates, Inc., 2020, pp. 9912-9924.
T. Chen et al., "TVM: An automated end-to-end optimizing compiler for deep learning," in13th USENIX Symposium on Operating Systems Design and Implementation (OSDI 18), Oct. 2018, pp. 578-594.
T. Chen et al., "DianNao: A small-footprint high-throughput accelerator for ubiquitous machine-learning," in Proceedings of the 19th International Conference on Architectural Support for Programming Languages and Operating Systems, ser. ASPLOS '14, 2014, p. 269-284.
T. Chen et al., "A simple framework for contrastive learning of visual representations," in Proceedings of the 37th International Conference on Machine Learning, ser. Proceedings of Machine Learning Research, H. D. III and A. Singh, Eds., vol. 119. PMLR, Jul. 13-18, 2020, pp. 1597-1607.
T. Chen et al., "Big self-supervised models are strong semi-supervised learners," in Advances in Neural Information Processing Systems, H. Larochelle, M. Ranzato, R. Hadsell, M. F. Balcan, and H. Lin, Eds., vol. 33.Curran Associates, Inc., 2020, pp. 22 243-22 255.
Y.-H. Chen et al., "Eyeriss: An energy efficient reconfigurable accelerator for deep convolutional neural networks," IEEE Journal of Solid-State Circuits, vol. 52, No. 1, pp. 127-138, 2017.
S. Cho et al., "McDRAM v2: In dynamic random access memory systolic array accelerator to address the large model problem in deep neural networks on the edge," IEEE Access, vol. 8, pp. 135 223-135 243, 2020.

(56) References Cited

OTHER PUBLICATIONS

B. Dally, "GTC China 2020 keynote," https://investor.nvidia.com/events-and-presentations/events-and-presentations/event-details/2020/GTC-China-2020-Keynote-Bill-Dally/default.aspx, 2020.
Q. Deng et al., "DrAcc: a dram based accelerator for accurate cnn inference," in 55thACM/ESDA/IEEE Design Automation Conference (DAC), 2018.
F. Devaux, "True Processing In Memory with DRAM accelerator," HotChips, 2019.
J. Devlin et al., "BERT: Pretraining of deep bidirectional transformers for language understanding," in Proceedings of the 2019 Conference of the North American Chapter of the Association for Computational Linguistics: Human Language Technologies, vol. 1.
[4V. Elango et al., "Diesel: Dsl for linear algebra and neural net computations on gpus," in Proceedings of the 2nd ACM SIGPLAN International Workshop on Machine Learning and Programming Languages, 2018.
M. Emani et al., "Accelerating scientific applications with sambanova reconfigurable dataflow architecture," Computing in Science Engineering, vol. 23, No. 2, pp. 114-119, 2021.
M. Gao et al., "Tetris: Scalable and efficient neural network acceleration with 3d memory," in Proceedings of the Twenty-Second International Conference on Architectural Support for Programming Languages and Operating Systems, ser. ASPLOS '17, 2017, p. 751-764.
M. Tan et al., "Efficientdet: Scalable and efficient object detection," in Proceedings of the IEEE/CVF Conference on Computer Vision and Pattern Recognition (CVPR), Jun. 2020.
G. Urban et al., "Do deep convolutional nets really need to be deep and convolutional?" in 5thInternational Conference on Learning Representations, ICLR 2017.
A. Vaswani et al., "Attention is all you need," in Advances in Neural Information Processing Systems, vol. 30, 2017.
O. Villa, et al., "Nvbit: A dynamic binary instrumentation framework for nvidia gpus," in Proceedings of the 52nd Annual IEEE/ACM International Symposium on Microarchitecture, ser. MICRO '52, 2019, p. 372-383.
G. Wang et al., "Blink: Fast and generic collectives for distributed ml," in Proceedings of Machine Learning and Systems, vol. 2, 2020, pp. 172-186.
M. Wilkening et al., "RecSSD: Near data processing for solid state drive based recommendation inference," in Proceedings of the 26th ACM International Conference on Architectural Support for Programming Languages and Operating Systems, ser. ASPLOS 2021, p. 717-729.
Y. Wu et al., "Tuning applications for efficient gpu offloading to in-memory processing," in Proceedings of the 34th ACM International Conference on Supercomputing, ser. ICS'20, 2020.
Y. Wu et al., "Group normalization," in Proceedings of the European Conference on Computer Vision (ECCV), Sep. 2018.
C. Xie, S. L. Song, J. Wang, W. Zhang, and X. Fu, "Processing-in-memory enabled graphics processors for 3d rendering," in 2017 IEEE International Symposium on High Performance Computer Architecture (HPCA), 2017, pp. 637-648.
D. Zhang et al., "TOP-PIM: Throughput-oriented programmable processing in memory," in Proceedings of the 23rd International Symposium on High-Performance Parallel and Distributed Computing, ser. HPDC '14, 2014, p. 85-98.
H. Zhang et al., "Poseidon: An efficient communication architecture for distributed deep learning on GPU clusters," in Proceedings of the 2017 USENIX Conference on Usenix Annual Technical Conference, ser. USENIX ATC '17, USA, 2017, p. 181-193.
"Batchnormalization layer," https://keras.io/api/layers/normalization_layers/batch_normalization, 2021.
"Nvidia a100 tensor core GPU architecture," https://images.nvidia.com/aem-dam/en-zz/Solutions/datacenter/nvidia-ampere-architecture-whitepaper.pdf, 2020.
"Nvidia a100 tensor core GPU," https://www.nvid/cia.com/content/dam/en-zz/Solutions/DataCenter/a100/pdf/a100-80gb-datasheet-update-nvidia-us-1521051-r2-web.pdf, Jan. 2021.
P. Brown, "Graphcore sets new ai performance standards with mk2ipu systems." [Online]. Available:https://www.graphcore.ai/posts/graphcore-sets-new-aiperformance-standards-with-mk2-ipu-systems.
D. Foley et al., "Ultra-performance pascal gpu and nvlink interconnect," IEEE Micro, vol. 37, No. 2, pp. 7-17, 2017.
N. P. Jouppi et al., "A domain-specific supercomputer for training deep neural networks," Commun. ACM, vol. 63, No. 7, p. 67-78, Jun. 2020.
W. Jung et al., "Deepcuts: A deep learning optimization framework for versatile gpu workloads," in Proceedings of the 42nd ACM SIGPLAN International Conference on Programming Language Design and Implementation, ser. PLDI 2021.
S. Knowles, "Graphcore Colossus Mk2 IPU," in 2021 IEEE Hot Chips 33 Symposium(HCS), 2021, pp. 1-25.
G. Koo et al., "Access pattern-aware cache management for improving data utilization in GPU," in Proceedings of the 44th Annual International Symposium on Computer Architecture, ser. ISCA '17, 2017, p. 307-319.
K. Lakhotia et al., "In-network reductions on multi-dimensional hyperx," in 2021 IEEE Symposiumon High-Performance Interconnects (HOTI), 2021, pp. 1-8.
S. Lee, "A 1ynm 1.25v 8gb, 16gb/s/pin gddr6-based accelerator-in-memory supporting 1tflops mac operation and various activation functions for deep-learning applications," in 2022 IEEE International Solid-State Circuits Conference (ISSCC), vol. 65, 2022, pp. 1-3.
S. Lie, "Multi-Million Core, Multi-Wafer AI Cluster," HotChips,2021.
J. Liu et al., "Processing-in-memory for energy-efficient neural network training: A heterogeneous approach," in 2018 51st Annual IEEE/ACM International Symposium on Microarchitecture (MICRO), 2018, pp. 655-668.
P. Micikevicius et al., "Mixed precision training," in 6th International Conference on Learning Representations, ICLR 2018.
W. Niu et al., "DNNfusion: Accelerating deep neural networks execution with advanced operator fusion," in Proceedings of the 42nd ACM SIGPLAN International Conference on Programming Language Design and Implementation, ser. PLDI 2021, 2021, p. 883-898.
P. M. Phothilimthana et al., "A flexible approach to autotuning multi-pass machine learning compilers," in 2021 30th International Conference on Parallel Architectures and Compilation Techniques (PACT).
S. Rajbhandari et al., "ZeRO: Memory optimization towards training A trillion parameter models," CoRR, vol. abs/1910.02054, 2019. http://arxiv.org/abs/1910.02054.
J. Ren et al., "ZeRO-Offload: Democratizing Billion Scale model training," in 2021 USENIX Annual Technical Conference.
F. Schuiki et al., "A scalable near-memory architecture for training deep neural networks on large in-memory datasets," IEEE Transactions on Computers, vol. 68, No. 4,pp. 484-497, 2019.
N. Vijaykumar et al., "The locality descriptor: A holistic cross-layer abstraction to express data locality in gpus," in 2018 ACM/IEEE 45th Annual International Symposium on Computer Architecture (ISCA), 2018, pp. 829-842.
Z. Wang et al., "Enabling efficient large-scale deep learning training with cache coherent disaggregated memory systems," in 2022 IEEE International Symposium on High-Performance Computer Architecture (HPCA), 2022.
H. Zhang et al., "Context encoding for semantic segmentation," in 2018IEEE/CVF Conference on Computer Vision and Pattern Recognition(CVPR). Los Alamitos, CA, USA: IEEE Computer Society, Jun. 2018, pp. 7151-7160.
Z. Zheng et al., "Astitch: Enabling anew multi-dimensional optimization space for memory-intensive ml training and inference on modern simt architectures," in Proceedings of the 27th ACM International Conference on Architectural Support for Programming Languages and Operating Systems, 2022.
D. Abts, "Think fast: A tensor streaming processor (TSP) for accelerating deep learning workloads," in Proceedings of the ACM/IEEE 47th Annual International Symposium on Computer Architecture. IEEE Press, 2020, p. 145-158.

(56) References Cited

OTHER PUBLICATIONS

J. Ahn, "PIM-enabled instructions: A low-overhead, locality-aware processing-in-memory architecture," in Proceedings of the 42nd Annual International Symposium on Computer Architecture, New York, NY, USA, 2015, p. 336-348.
A. Boroumand, "Google workloads for consumer devices: Mitigating data movement bottlenecks," in Proceedings of the Twenty-Third International Conference on Architectural Support for Programming Languages and Operating Systems, 2018, p. 316-331.
G. Chen, "An 8-core RISC-V processor with compute near last level cache in intel 4 cmos," in 2022 Symposium on VLSI Circuits, 2022.
S. Chetlur et al., "cuDNN: Efficient primitives for deep learning," CoRR, vol. abs/1410.0759, 2014 http://arxiv.org/abs/1410.0759.
G. Kim et al., "Memory-centric system interconnect design with Hybrid Memory Cubes," Proceedings of the 22nd International Conference on Parallel Architectures and Compilation Techniques, 2013, pp. 145-155, doi: 10.1109/PACT.2013.6618812.
M. Imani et al., "FloatPIM: In-memory acceleration of deep neural network training with high precision," in2019 ACM/IEEE 46th Annual International Symposium on Computer Architecture (ISCA), 2019, pp. 802-815.
J. Park et al., "TRiM: Enhancing processor-memory interfaces with scalable tensor reduction in memory," in MICRO-54: 54th Annual IEEE/ACM International Symposium on Microarchitecture, ser. MICRO '21, 2021, p. 268-281.
A. Pattnaik et al., "Opportunistic computing in GPU architectures," in Proceedings of the 46th International Symposium on Computer Architecture, ser. ISCA '19, 2019, p. 210-223.
D. Wu et al., "SECO: A scalable accuracy approximate exponential function via cross-layer optimization," in 2019 IEEE/ACM International Symposium on Low Power Electronics and Design (ISLPED), 2019,pp. 1-6.
"Nvidia tesla v100 GPU architecture," Santa Clara, CA, USA, Nvidia, WhitePaper, 2017. [Online]. Available: https://images.nvidia.com/content/voltaarchitecture/pdf/volta-architecture-whitepaper.pdf.
"AMD instinct™ MI100 accelerator," https://www.amd.com/en/products/server-accelerators/instinct-mi100, 2020.
"AMD instinct™ mi250x accelerator," [Online]. Available: https://www.amd.com/en/products/server-accelerators/instinct-mi250x, 2021.
"AMD radeon instinct™ mi50 accelerator (16gb)," https://www.amd.com/en/products/professional-graphics/instinct-mi50,2018.
"CuBLAS toolkit documentation," https://docs.nvidia.com/cuda/cublas/index.html, 2012.
G. Kim et al., "Multi-GPU System Design with Memory Networks," 2014 47th Annual IEEE/ACM International Symposium on Microarchitecture, 2014, pp. 484-495, doi: 10.1109/MICRO.2014.55.
G. Kim et al., "FlexiBuffer: Reducing leakage power in on-chip network routers," 2011 48th ACM/EDAC/IEEE Design Automation Conference (DAC), 2011, pp. 936-941.
G. Kim et al., "Contention-based congestion management in large-scale networks," 2016 49th Annual IEEE/ACM International Symposium on Microarchitecture (MICRO), 2016, pp. 1-13, doi: 10.1109/MICRO.2016.7783733.
G. Kim et al., "TCEP: Traffic Consolidation for Energy-Proportional High-Radix Networks," 2018 ACM/IEEE 45th Annual International Symposium on Computer Architecture (ISCA), 2018, pp. 712-725, doi: 10.1109/ISCA.2018.00065.
G. Kim et al., "Automatically exploiting implicit Pipeline Parallelism from multiple dependent kernels for GPUs," 2016 International Conference on Parallel Architecture and Compilation Techniques (PACT), 2016, pp. 339-350, doi: 10.1145/2967938.2967952.
S. Xie et al., "Aggregated Residual Transformations for Deep Neural Networks," 2017 IEEE Conference on Computer Vision and Pattern Recognition (CVPR), 2017, pp. 5987-5995, doi: 10.1109/CVPR.2017.634.
G. Huang et al., "Densely Connected Convolutional Networks", 2017 IEEE Conference on Computer Vision and Pattern Recognition (CVPR), 2017, pp. 2261-2269, doi: 10.1109/CVPR.2017.243.
G.-S. Xia et al., "DOTA: A Large-Scale Dataset for Object Detection in Aerial Images," 2018 IEEE/CVF Conference on Computer Vision and Pattern Recognition, 2018, pp. 3974-3983, doi: 10.1109/CVPR.2018.00418.
J. Alammar, "How GPT3 Works—Visualizations and Animations", http://jalammar.github.io/how-gpt3-works-visualizations-animations/, 2020.
A. Chaudhary, "The Illustrated SimCLR Framework", https://amitness.com/2020/03/illustrated-simclr/, 2020.
N. Luehr, "NCCL: Accelerated collective communications for GPUS", https://on-demand.gputechconf.com/gtc/2016/presentation/s6616-nathan-luehr-nccl.pdf, 2016.
A. Gholami et al., "Ai and memory wall," RiseLab Medium Post, https://medium.com/riselab/ai-and-memory-wall-2cb4265cb0b8, 2021.
R. L. Graham et al., "Scalable hierarchical aggregation protocol (sharp): A hardware architecture for efficient data reduction," First International Workshop on Communication Optimizations in HPC (COMHPC), 2016.
J.-B. Grill et al., "Bootstrap your own latent—a new approach to self-supervised learning," in Advances in Neural Information Processing Systems, H. Larochelle, M. Ranzato, R. Hadsell, M. F. Balcan, and H. Lin, Eds., vol. 33. Curran Associates, Inc., 2020, pp. 21 271-21 284.
B. Hong et al., "Multi-dimensional parallel training of winograd layer on memory-centric architecture," in Proceedings of the 51st Annual IEEE/ACM International Symposium on Microarchitecture, ser. MICRO-51. IEEE Press, 2018, p. 682-695.
K. Hsieh et al., "Transparent offloading and mapping (tom): Enabling programmer-transparent near-data processing in gpu systems," in Proceedings of the 43rd International Symposium on Computer Architecture, 2016.
J. Hu et al., "Squeeze-and-excitation networks," in2018 IEEE/CVF Conference on Computer Vision and Pattern Recognition, 2018, pp. 7132-7141.
A. Ishii et al., "NVSwitch and DGX-2," HotChips,2018.
A. Ivanov et al., "Data Movement is all you need: A case study on optimizing transformers," in Proceedings of Machine Learning and Systems, vol. 3, 2020.
S. Jeaugey, "S21107-Distributed Training and Fast Inter-GPU communication with NCCL," Nvidia GPU Technology Conference, 2020.
Z. Jia et al., "Dissecting the graphcore IPU architecture via microbenchmarking," 2019.
L. Jiang et al., "XNOR-POP: A processing in-memory architecture for binary convolutional neural networks inwide-io2 drams," in 2017 IEEE/ACM International Symposium on Low Power Electronics and Design (ISLPED), 2017, pp. 1-6.
N. Jiang et al., "A detailed and flexible cycle accurate network-on-chip simulator," in 2013 IEEE International Symposium on Performance Analysis of Systems and Software, 2013.
N. P. Jouppi et al., "Ten lessons from three generations shaped google's tpuv4i : Industrial product," in2021 ACM/IEEE 48th Annual International Symposium on Computer Architecture (ISCA), 2021, pp. 1-14.
W. Jung et al., "Restructuring batch normalization to accelerate cnn training," in Proceedings of Machine Learning and Systems, vol. 1, 2019, pp. 14-26.
V. Kandiah et al., "Accelwattch: A power modeling framework for modern gpus," in 54th Annual IEEE/ACM International Symposium on Microarchitecture, ser. MICRO '21.
B. Kim et al., "TRIM: Tensor reduction in memory," IEEE Computer Architecture Letters, vol. 20,No. 1, pp. 5-8, 2021.
D. Kim et al., "Neurocube: A programmable digital neuromorphic architecture with high-density 3d memory," in 2016 ACM/IEEE 43rd Annual International Symposium on Computer Architecture (ISCA), 2016.
G. Kim et al., "Toward standardized near-data processing with unrestricted data placement for gpus," in Proceedings of the International Conference for High Performance Computing, Networking, Storage and Analysis, ser. SC'17, 2017.
H. Kim et al., "GradPIM: A practical processing-in-dram architecture for gradient descent," in 2021 IEEE International Symposium on High-Performance Computer Architecture (HPCA), 2021.

(56) References Cited

OTHER PUBLICATIONS

B. Klenk et al., "An in-network architecture for accelerating shared-memory multiprocessor collectives," in 2020 ACM/IEEE 47th Annual International Symposium on Computer Architecture (ISCA), 2020, pp. 996-1009.

D. P. Kingma et al., "ADAM: A method for stochastic optimization," in 3rd International Conference on Learning Representations, ICLR 2015.

Y. Kwon et al., "Tensor casting: Co-designing algorithm-architecture for personalized recommendation training," in 2021 IEEE International Symposium on High-Performance Computer Architecture (HPCA), 2021, pp. 235-248.

C. Szegedy et al., "Rethinking the inception architecture for computer vision," in Proceedings of the IEEE Conference on Computer Vision and Pattern Recognition(CVPR), Jun. 2016.

S. Li et al., "DRISA: A DRAM-based reconfigurable in-situ accelerator," in 2017 50thAnnual IEEE/ACM International Symposium on Microarchitecture(MICRO), 2017, pp. 288-301.

Y. Li et al., "Accelerating distributed reinforcement learning with in-switch computing," in Proceedings of the 46th International Symposium on Computer Architecture, ser. ISCA '19, 2019, p. 279-291.

K. Kim et al., "Disaggregated memory for expansion and sharing in blade servers," in Proceedings of the 36th Annual International Symposium on Computer Architecture, ser. ISCA '09, 2009, p. 267-278.

T. Lin et al., "Feature pyramid networks for object detection," in 2017 IEEE Conference on Computer Vision and Pattern Recognition (CVPR). Los Alamitos, CA, USA: IEEE Computer Society, Jul. 2017, pp. 936-944.

S. Liu et al., "Cambricon: An instruction set architecture for neural networks," in2016 ACM/IEEE 43rd Annual International Symposium on Computer Architecture (ISCA), 2016, pp. 393-405.

S. A. Mojumder et al., "MGPU-TSM: A multi gpu system with truly shared memory," CoRR, vol. abs/2008.02300,2020.

R. Nair et al., "Active memory cube: A processing-in-memory architecture for exascale systems," IBM Journal of Research and Development, vol. 59, No. 2/3, pp. 17:1-17:14, 2015.

A. V. Nori et al., "Reduct: Keep it close, keep it cool! : Efficient scaling of dnn inference on multicore cpus with near-cache compute," in 2021 ACM/IEEE 48th Annual International Symposium on Computer Architecture (ISCA), 2021,pp. 167-180.

T. Park et al., "Semantic image synthesis with spatially-adaptive normalization," in 2019 IEEE/CVF Conference on Computer Vision and Pattern Recognition (CVPR),2019, pp. 2332-2341.

A. Paszke et al., "PyTorch: An imperative style, high performance deep learning library," in Advances in Neural Information Processing Systems 32. Curran Associates, Inc., 2019.

P. Patarasuk et al., "Bandwidth optimal all-reduce algorithms for clusters of workstations," J. Parallel Distrib. Comput., vol. 69,No. 2, p. 117-124, Feb. 2009.

A. Pattnaik et al., "Scheduling techniques for gpu architectures with processing-in-memory capabilities," in Proceedings of the 2016 International Conference on Parallel Architectures and Compilation, ser. PACT '16, 2016, p. 31-44.

C. Peng et al., "MegDet: A large mini-batch object detector," in 2018 IEEE/CVF Conference on Computer Vision and Pattern Recognition, 2018, pp. 6181-6189.

S. Rashidi et al., "Enabling compute-communication overlap in distributed deep learning training platforms," in ACM/IEEE 48thAnnual International Symposium on Computer Architecture (ISCA), 2021.

O. Ronneberger et al., "U-net: Convolutional networks for biomedical image segmentation," in Medical Image Computing and Computer-Assisted Intervention—MICCAI 2015.Cham: Springer International Publishing, 2015, pp. 234-241.

N. Rotem et al., "Glow: Graph lowering compiler techniques for neural networks," arXiv:1805.00907v3, 2018.

O. Russakovsky et al., "ImageNet Large Scale Visual Recognition Challenge," International Journal of Computer Vision, vol. 115, No. 3, 2015.

A. Sapio et al., "Scaling distributed machine learning with In-Network aggregation," in 18th USENIX Symposium on Networked Systems Design and Implementation (NSDI21), Apr. 2021, pp. 785-808.

H. Shin et al., "McDRAM: Low latency and energy-efficient matrix computations in dram," IEEE Transactions on Computer-Aided Design of Integrated Circuits and Systems, vol. 37, No. 11, pp. 2613-2622, 2018.

M. Shoeybi et al., "Megatron-lm: Training multi-billion parameter language models using model parallelism," arXiv:1909.08053v4, 2020.

G. Singh et al., "FPGA-based near-memory acceleration of modern data-intensive applications," IEEE Micro, vol. 41, No. 4,pp. 39-48, 2021.

G. Singh et al., "NERO: A near high-bandwidth memory stencil accelerator for weather prediction modeling," in 202030th International Conference on Field-Programmable Logic and Applications (FPL), 2020, pp. 9-17.

D. Stosic, "Introduction to Mixed Precision Training," ICCV'19 Tutorial on Accelerating Computer Vision with Mixed Precision, 2019.

I. Sutskever et al., "On the importance of initialization and momentum in deep learning," in Proceedings of the 30th International Conference on International Conference on Machine Learning—vol. 28, ser. ICML'13. JMLR.org, 2013, p. III-1139-III-1147.

M. Tan et al., "EfficientNet: Rethinking model scaling for convolutional neural networks," in Proceedings of the 36th International Conference on Machine Learning, ser. Proceedings of Machine Learning Research, vol. 97. PMLR, Jun. 9-15, 2019, pp. 6105-6114.

M. Tan et al., "Efficientnetv2: Smaller models and faster training," in Proceedings of the 38th International Conference on Machine Learning, ser. Proceedings of Machine Learning Research, vol. 139.PMLR, 2021, pp. 10 096-10 106.

* cited by examiner

FIG. 8A

| Base Address | Address Bound | Pivot Dimension | Tensor Shape | NDP Kernel ID | Filter Argument |
|---|---|---|---|---|---|
|  |  |  |  |  |  |

FIG. 8B

| NDP Kernel ID | Code Location | Number of Static Registers | Number of Dynamic Registers | Number of Requests Per Micro-context | Number of Remaining Micro-contexts |
|---|---|---|---|---|---|
|  |  |  |  |  |  |

FIG. 8C

| NDP Kernel ID | Pivot Index | Static Register Base ID | Number of Remaining Packets |
|---|---|---|---|
|  |  |  |  |

```
// initialize reg.
VLI v0 0
VLI v1 0
```

FIG. 9A

```
// load req's data,x
VLS v2 REQDATA

// accumulate x, x2
VADD v0 v0 v2
VFMA v1 v1 v2 v2

// store req's data, x
LS r1 REQADDR
VST v2 0(r1)
```

FIG. 9B

```
LS r1 FILTERARG
// divide by # of x's
VMULI v0 v0 0.25
VMULI v1 v1 0.25

// store µ
VST v0 0(r1)

VMUL v0 v0 v0
VSUB v1 v1 v0
VSQRT v1 v1

// store σ
VST v1 0x400(r1)
```

FIG. 9C

| Base Address | Address Bound | Pivot Dimension | Tensor Shape | NDP Kernel ID | Filter Argument |
|---|---|---|---|---|---|
| 0x000 | 0x100 | 0 | (4, 32) | 0 | 0x200 |

FIG. 10A

| NDP Kernel ID | Code Location | Number of Static Registers | Number of Dynamic Registers | Number of Requests Per Micro-context | Number of Remaining Micro-contexts |
|---|---|---|---|---|---|
| 0 | 0x300 | 2 | 2 | 4 | 2 |

FIG. 10B

| NDP Kernel ID | Pivot Index | Static Register Base ID | Number of Remaining Packets |
|---|---|---|---|
| 0 | 0 | 0 | 4 |
| 0 | 0 | 2 | 4 |

FIG. 10C

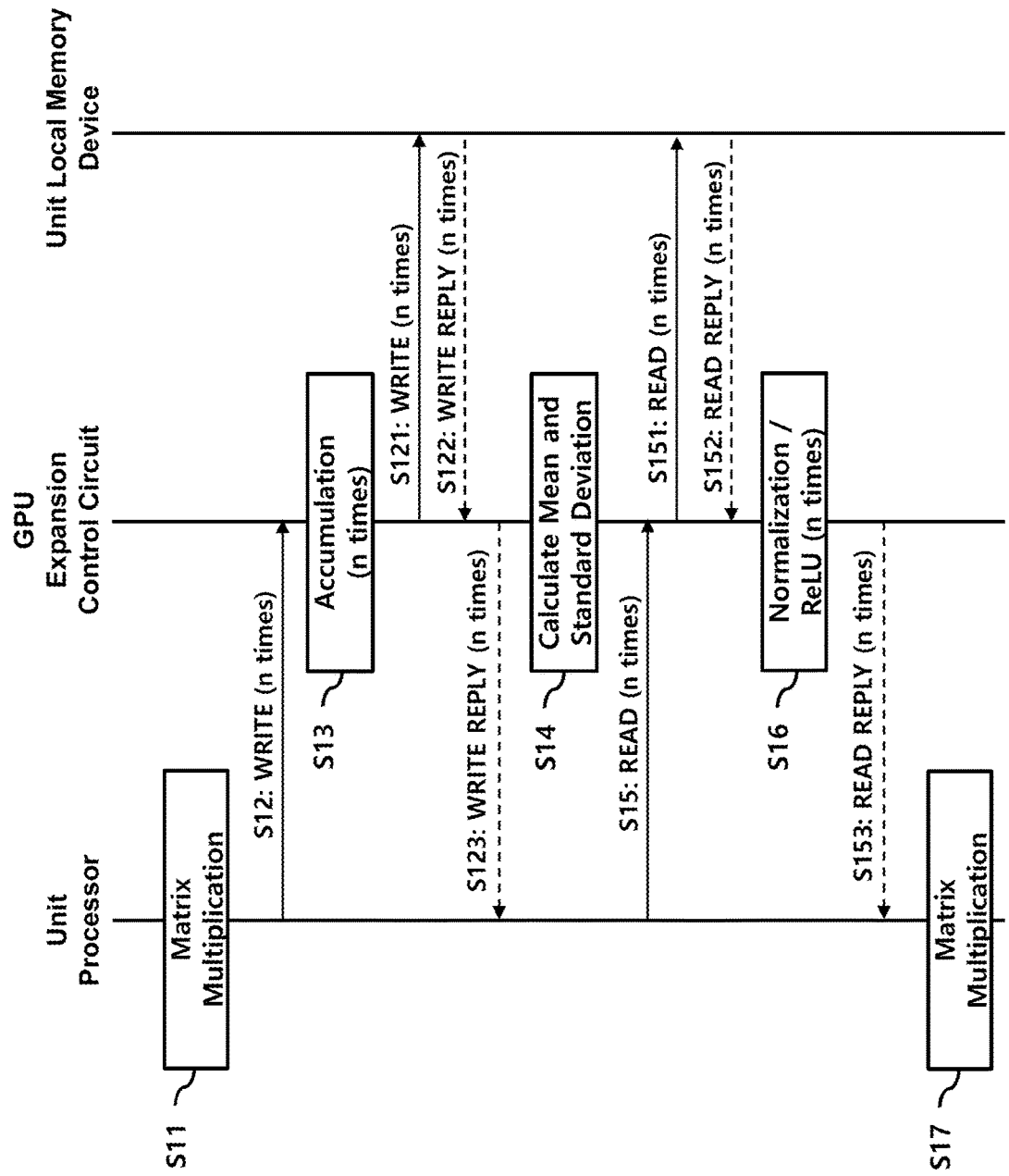

HOST DEVICE PERFORMING NEAR DATA PROCESSING FUNCTION AND ACCELERATOR SYSTEM INCLUDING THE SAME

CROSS-REFERENCE TO RELATED APPLICATIONS

The present application claims priority under 35 U.S.C. § 119(a) to Korean Patent Applications No. 10-2021-0184439, filed on Dec. 22, 2021, and No. 10-2022-0137080, filed on Oct. 24, 2022, which is incorporated herein by reference in its entirety.

BACKGROUND

1. Technical Field

Embodiments relate to a host device performing a near data processing function and an accelerator system including the host device.

2. Related Art

As the number of parameters of a deep neural network (DNN) increases, the size of training data increases, and the iterative executions of a learning algorithm increase, it is becoming important to improve the computational performance of an accelerator for operations of the deep neural network.

Operations used by a deep neural network can be divided into arithmetic operations, memory operations, and communication operations, and a matrix multiplication operation performed for a convolution operation and the like typically occupies the largest portion of the operations.

In order to efficiently perform arithmetic operations, a graphic processing unit (GPU) including special arithmetic units that accelerate matrix multiplication, such as tensor cores and matrix cores, may be used.

Improvements of memory operation and communication operation performance lags compared to improvements in computation operation performance, and accordingly, the proportion of time spent in memory operations and communication operations is increasing in the latest deep neural networks.

Recently, near data processing (NDP) and processing in memory (PIM) technology have been introduced, but there is a problem of sacrificing storage space by adding a computation circuit inside the memory device.

SUMMARY

In accordance with an embodiment of the present disclosure, a host device may include a unit processor configured to generate a near data processing (NDP) request; a host expansion control circuit configured to receive the NDP request; and a local memory device configured to store data corresponding to the NDP request according to control by the host expansion control circuit, wherein in response to the NDP request, the host expansion control circuit performs a request processing operation to perform a memory operation corresponding to the NDP request on the local memory device, the memory operation including a read operation or a write operation, and a computation operation using the data corresponding to the NDP request.

In accordance with an embodiment of the present disclosure, an accelerator system may include a host device including a unit processor; a memory expansion device; and an interconnect circuit configured to connect the host device and the memory expansion device, wherein the host device includes a host expansion control circuit configured to receive a near data processing (NDP) request provided from the unit processor; and a local memory device configured to store data corresponding to the NDP request according to control by the host expansion control circuit, and wherein in response to the NDP request, the host expansion control circuit performs a request processing operation to perform a memory operation corresponding to the NDP request on the local memory device, the memory operation including a read operation or a write operation, and a computation operation using the data corresponding to the NDP request.

BRIEF DESCRIPTION OF THE DRAWINGS

The accompanying figures, wherein like reference numerals refer to identical or functionally similar elements throughout the separate views, together with the detailed description below, are incorporated in and form part of the specification, and serve to further illustrate embodiments that include various features, and explain various principles and beneficial aspects of those embodiments.

FIGS. 8A, 8B, and 8C illustrate tables used in a memory expansion device according to an embodiment of the present disclosure.

FIGS. 9A, 9B, and 9C illustrate software codes of an NDP kernel according to an embodiment of the present disclosure.

FIGS. 10A, 10B, and 10C illustrate tables set by an NDP start packet according to an embodiment of the present disclosure.

FIG. 15 illustrates a deep neural network operation according to the embodiment of FIG. 11.

DETAILED DESCRIPTION

Various embodiments will be described below with reference to the accompanying figures. Embodiments are provided for illustrative purposes and other embodiments that are not explicitly illustrated or described are possible. Further, modifications can be made to the embodiments of the present disclosure that are described below in detail.

Figure 1:
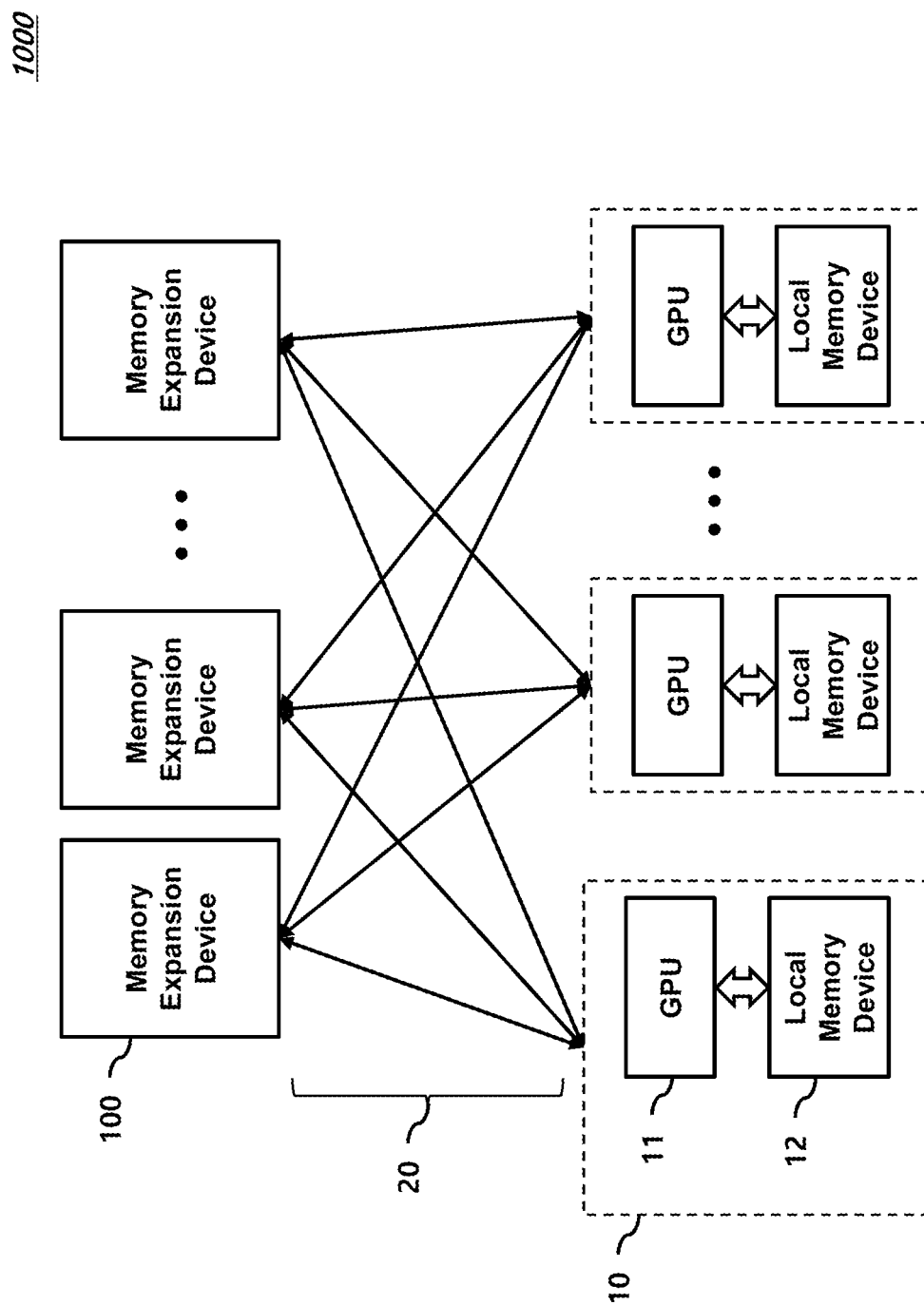
FIG. 1 illustrates an accelerator system according to an embodiment of the present disclosure.

FIG. 1 is a block diagram illustrating an accelerator system 1000 according to an embodiment of the present disclosure.

The accelerator system 1000 includes a plurality of host devices 10, a plurality of memory expansion devices 100, and an interconnect network 20 connecting the host devices 10 and the memory expansion devices 100.

In the present embodiment, a request transmitted among the host devices 10, the interconnect network 20, and the memory expansion devices 100 may have a packet structure in which an address and data are formatted in a predetermined form.

The host device 10 includes a processor 11 and a memory device 12. In this embodiment, the processor 11 is a graphic processing unit (GPU) 11, and accordingly, the host device 10 may be referred to as a graphic processing device 10.

The memory device 12 is a memory device exclusively used by the GPU 11, and may be referred to as a graphic memory device 12 or a local memory device 12.

The graphic memory device 12 is not limited to a specific type of memory device, and various memory devices such as a Dynamic Random Access Memory (DRAM), a graphic DRAM, and a High Bandwidth Memory (HBM) may be used.

The GPU 11, the memory expansion device 100, or both may include a near data processing (NDP) function. FIG. 1 corresponds to an embodiment wherein the memory expansion device 100 includes the NDP function. An embodiment wherein the GPU 11 includes the NDP function will be disclosed with reference to FIG. 11.

The memory expansion device 100 including the NDP function may be referred to as an NDP expansion (NDPX) device 100.

Figure 2:
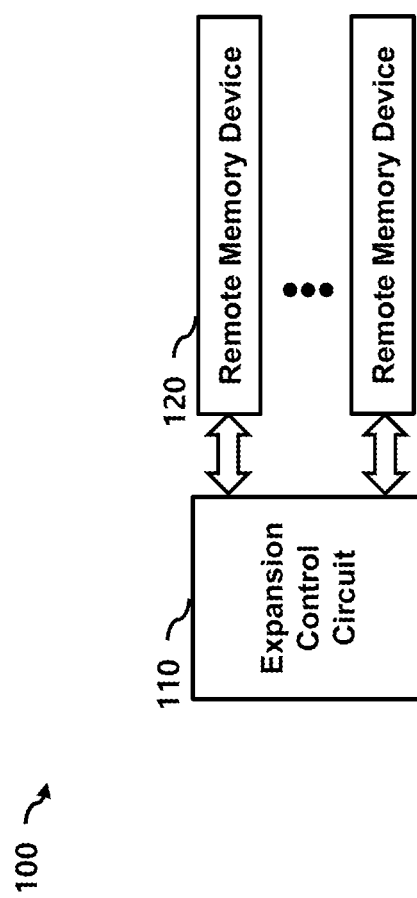
FIG. 2 illustrates a memory expansion device according to an embodiment of the present disclosure.

As shown in FIG. 2, the memory expansion device 100 includes an expansion control circuit 110 and a plurality of memory devices 120. The memory device 120 may be referred to as an expansion memory device 120 or a remote memory device 120.

The expansion control circuit 110 may support a communication function via the interconnect network 20 by performing a switch function.

The interconnect network 20 is a network in which a plurality of graphic processing devices 10 and a plurality of memory expansion devices 100 are fully connected.

In this embodiment, the plurality of GPUs 11 and the plurality of memory expansion devices 100 share an address space.

Accordingly, each GPU 11 may access any of the remote memory devices 120 using a read or write request. Also, in some embodiments, one memory expansion device 100 can access another memory expansion device 100.

Figure 3:
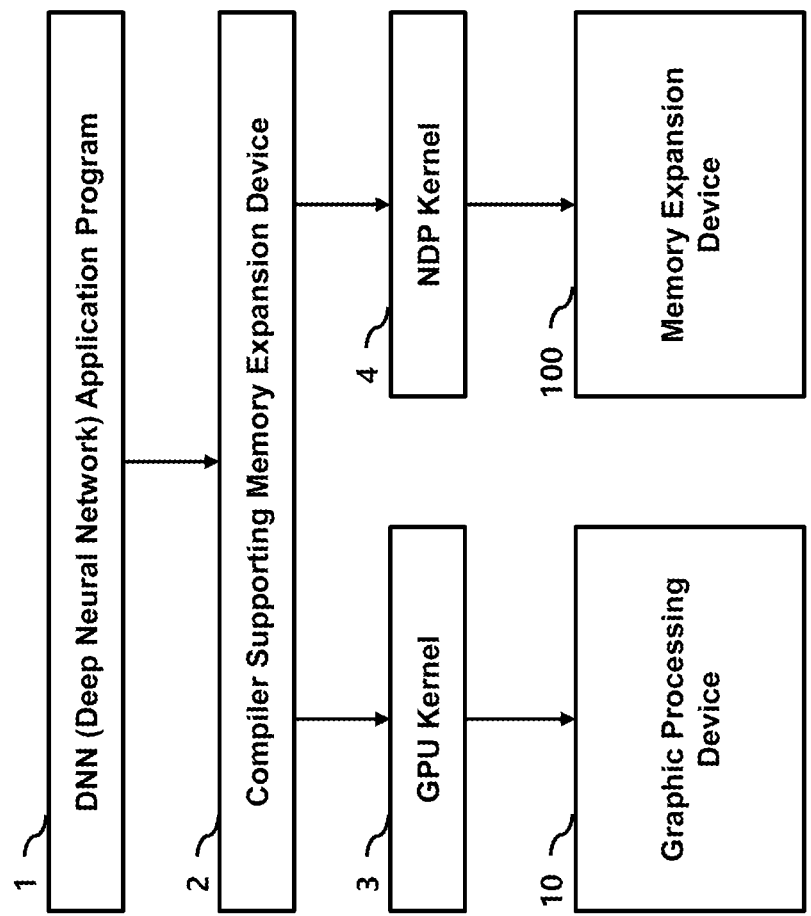
FIG. 3 illustrates a control process for a graphic processing device and a memory expansion device according to an embodiment of the present disclosure.

FIG. 3 illustrates a control process for the graphic processing device 10 and the memory expansion device 100 according to an embodiment of the present disclosure.

A deep neural network (DNN) application program 1 is compiled by a compiler 2 that supports memory expansion devices 100.

The compiler 2 generates a GPU kernel 3 performed by the graphic processing device 10 and an NDP kernel 4 performed by the memory expansion device 100.

In the field of computer science, a kernel is a term having various meanings. In the present embodiment, "kernel" is interpreted as having the same meaning as "function."

A read or write request to the memory expansion device 100 may occur while the graphic processing device 10 executes the GPU kernel 3, and in response to each request, the memory expansion device 100 may execute the NDP kernel 4.

The request generated by the GPU kernel 3 and the NDP kernel 4 corresponding thereto may be predetermined by the compiler 2.

Figure 4:
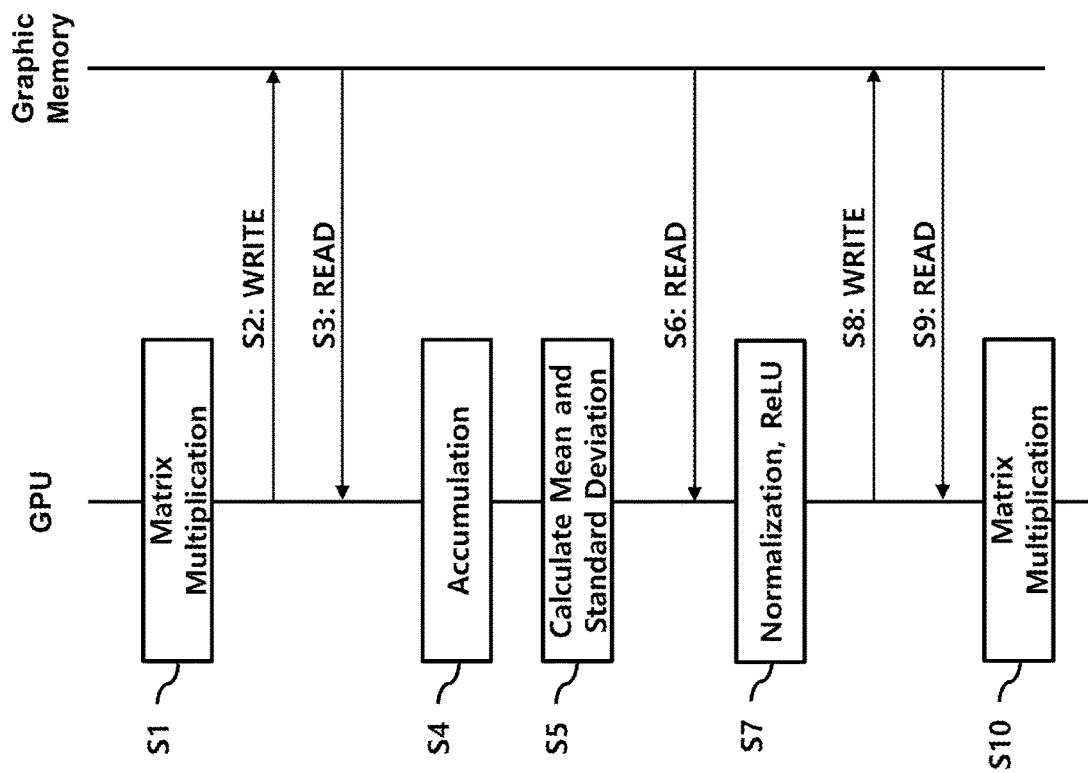
FIG. 4 illustrates a conventional deep neural network operation.

FIG. 4 shows an example of deep neural network (DNN) operations according to a conventional art.

FIG. 4 illustrates a case in which the computation operations are performed in the order of a convolution operation, a batch normalization operation, a rectified linear unit (ReLU) operation, and a convolution operation.

Hereinafter, data input to the deep neural network or output from each layer of the deep neural network is referred to as tensor data.

In the illustrated example of FIG. 4, the tensor data input for matrix multiplication is provided in advance to the GPU 11.

First, for a convolution operation, the GPU 11 performs matrix multiplication at S1, and stores the multiplication result in the local memory device 12 at S2.

Thereafter, the entire multiplication result is read back from the local memory device 12 at S3, the GPU 11 performs an accumulation operation at S4, and mean and standard deviation are calculated at S5.

Thereafter, the multiplication result is read again in the local memory device 12 at S6, a normalization operation and a ReLU operation are performed at S7, and tensor data, which is the operation result, is stored in the local memory device 12 at S8.

Finally, tensor data is read from the local memory device 12 at S9 for use in a matrix multiplication at S10 for the next convolution operation.

As described above, in the related art, all computation operations are performed in the GPU 11, and read and write operations are frequently performed between the GPU 11 and the local memory device 12 due to insufficient internal buffers in the GPU 11.

In addition, it takes a lot of time to perform the neural network operations because computation operations and memory operations are alternately performed. The memory operation may be represented as a request processing operation.

Figure 5:
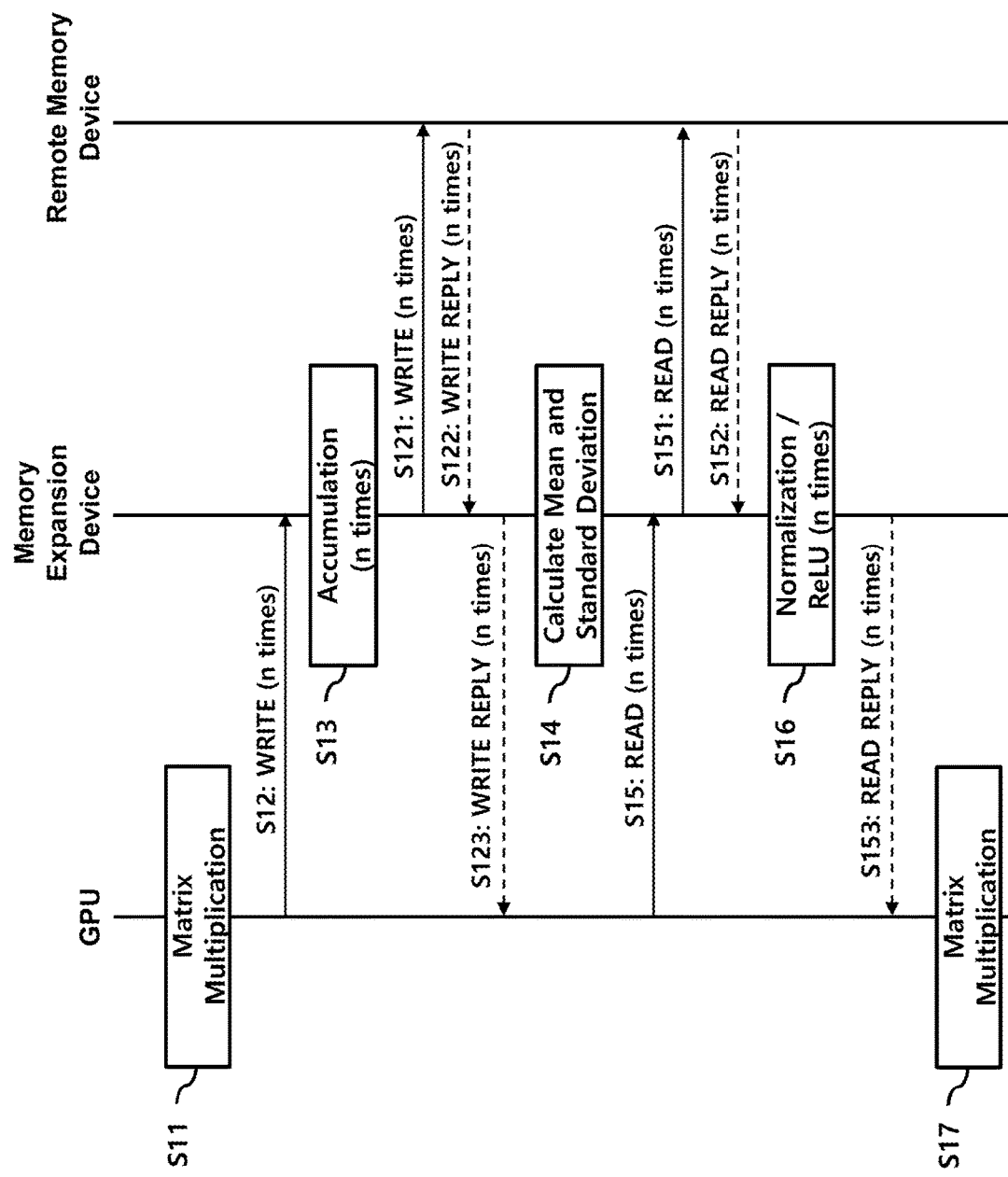
FIG. 5 illustrates a deep neural network operation according to an embodiment of the present disclosure.

FIG. 5 shows a deep neural network operation according to an embodiment of the present disclosure.

Like FIG. 4, FIG. 5 also illustrates a case in which neural network operations are performed in the order of a convolution operation, a batch normalization operation, a ReLU operation, and a convolution operation In the present embodiment, the matrix multiplication operation for convolution is performed in the GPU 11, but the normalization operation and the ReLU operation may be performed inside the memory expansion device 100 that is performing a near data processing (NDP) function.

The accumulation operation and calculation operation of mean and standard deviation required for the normalization operation may also be performed inside the memory expansion device 100.

In the example illustrated in FIG. 5, the input tensor data for matrix multiplication is provided in advance to the GPU 11.

First, the GPU 11 performs a matrix multiplication at S11. The multiplication result is transmitted to the memory expansion device 100 using a write request packet at S12.

In the present embodiment, a write operation for storing data in the remote memory device 120 by a write request at S121 corresponding to the write request packet at S12 and an NDP operation in the NDP circuit inside the memory expansion device 100 at S13 may be simultaneously performed. This may be referred to as an on-the-fly NDP operation.

In the present embodiment, requests for read or write operations of the remote memory device 120 may be divided into requests for which the on-the-fly NDP operation is performed together with the read or write operation and requests for which the on-the-fly NDP operation is not performed with the read or write operation.

Hereinafter, a request for which an on-the-fly NDP operation is performed is referred to as an NDP request, and a request other than the on-the-fly NDP operation is referred to as a normal request.

Accordingly, a write request from the GPU 11 to the memory expansion device 100 may be either an NDP write request or a normal write request, and a read request from the GPU 11 to the memory expansion device 100 may be either an NDP read request or a normal read request. The write request and read request of S12 and S15 of FIG. 5 are an NDP write request and an NDP read request, respectively.

In FIG. 5, the write operations in S12 and S121 and the accumulation operation S13 may be performed a plurality of times, for example, n times where n is a natural number, respectively. In this case, n depends on the size of the tensor data and the size of the packet.

For example, when tensor data is provided through n write request packets, n write requests at S12 and S121 and n accumulation operations at S13 corresponding to the n write requests may be performed. A write reply may be provided from the remote memory device 120 at S122 per each write request at S121 and a write reply may be provided from the memory expansion device 100 at S123 per each write request at S12.

Thereafter, mean and standard deviation is calculated at S14.

In the present embodiment, n accumulation operations at S13 and the calculation operation for the mean and standard deviation at S14 may be executed through one NDP kernel. This will be disclosed in detail below.

Thereafter, the GPU 11 reads tensor data from the remote memory device 120 for a second convolution operation at S15.

An on-the-fly NDP operation may be performed while reading tensor data from a remote memory device 120. In the present embodiment, normalization and ReLU calculation operation is performed as an on-the-fly NDP operation at S16.

In FIG. 5, n read requests are provided to the memory expansion device 100 at S15 and corresponding n read requests are provided to the remote memory device 120. Data may be provided n times from the remote memory device 100 with a read reply at S152 from the remote memory device 120 and n normalization and ReLU calculation operations at S16 may be performed as NDP operations corresponding to the n read requests at S15. Results of the normalization and ReLU calculations at S16 may be provided to the GPU 11 as read replies at S153.

Then, the next matrix multiplication is performed using the normalization and ReLU calculation results at S17.

In the present embodiment, since data is transmitted between the GPU 11 and the memory expansion device 100 through the interconnect network 20, additional time for a communication operation may be required.

However, the on-the-fly NDP operation of the memory expansion device 100 may overlap the memory read/write operation, and thus more time can be saved, and as a result, the overall deep neural network operation time can be significantly reduced.

In FIG. 5, since the result of the matrix multiplication performed by the GPU 11 is used by the memory expansion device 100, a dependency relationship exists between the GPU operation and the NDP operation.

When a dependency relationship does not exist between the GPU operation and the NDP operation, the GPU operation and the NDP operation may also overlap, and in this case, more time may be saved.

Figure 6:
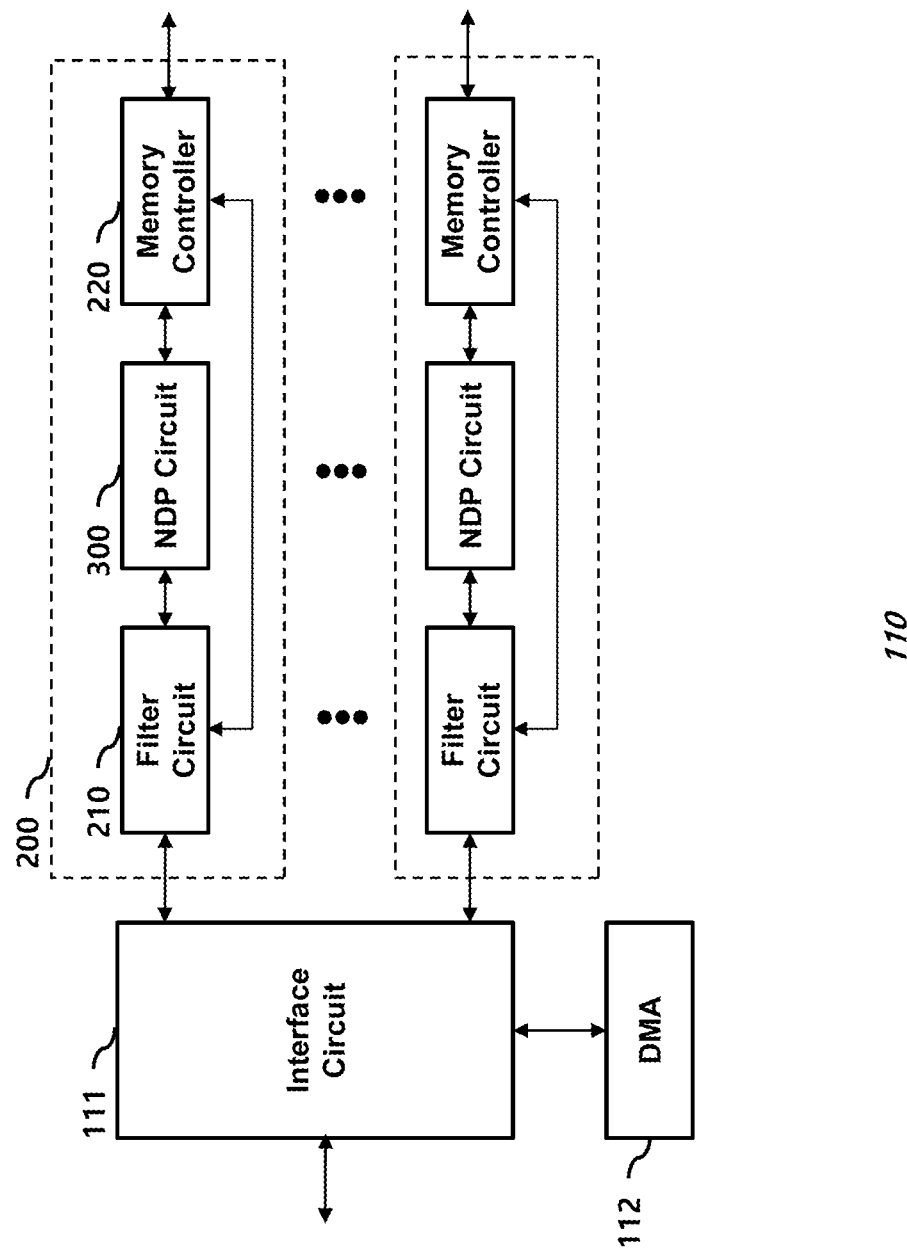
FIG. 6 illustrates an expansion control circuit according to an embodiment of the present disclosure.

FIG. 6 is a block diagram illustrating an expansion control circuit 110 according to an embodiment of the present disclosure.

The expansion control circuit 110 includes an interface circuit 111, a direct memory access (DMA) circuit 112, and a plurality of NDP request control circuits 200.

The interface circuit 111 transmits packets between the plurality of NDP request control circuits 200 and the interconnect network 20.

The address range of each NDP request control circuit 200 is assigned according to a corresponding remote memory device 120, and the interface circuit 111 determines an address of an input request packet and sends it to a corresponding NDP request control circuit 200.

The DMA circuit 112 may generate a request packet inside the memory expansion device 100 using a conventional DMA technology and may be connected to the interface circuit 111.

For example, the request packet generated by the DMA circuit 112 may have the same form as the request packet provided from the host device 10.

Accordingly, a request generated by one memory expansion device 100 may be internally processed or transmitted to another memory expansion device.

The plurality of NDP request control circuits 200 are connected between the interface circuit 111 and the plurality of remote memory devices 120 to perform memory operations and NDP operations.

Each NDP request control circuit 200 respectively includes a filter circuit 210, an NDP circuit 300, and a memory controller 220.

The filter circuit 210 identifies whether the request packet provided through the interface circuit 111 is an NDP request packet or a normal request packet. An operation of the filter circuit 210 will be described in detail below.

Figure 7:
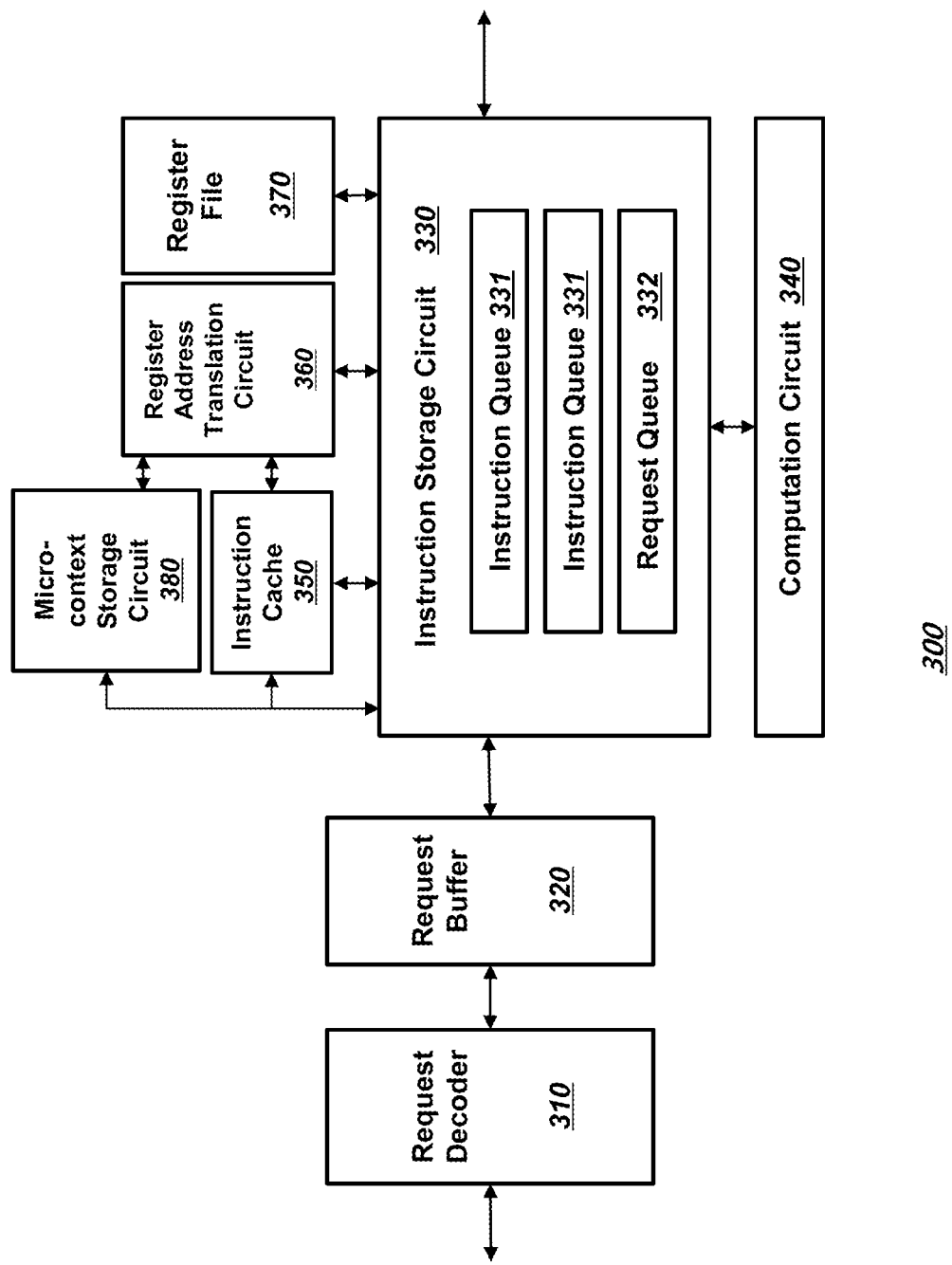
FIG. 7 illustrates a near data processing (NDP) circuit according to an embodiment of the present disclosure.

FIG. 7 is a block diagram illustrating an NDP circuit 300 according to an embodiment of the present disclosure.

The NDP circuit 300 includes a request decoder 310, a request buffer 320, an instruction storage circuit 330, a computation circuit 340, an instruction cache 350, a register address translation circuit 360, a register file 370, and a micro-context storage circuit 380.

The request decoder 310 modifies the request transmitted from the filter circuit 210 so that information necessary for the NDP operation is included and outputs the result of the modification as a decoded request.

The request buffer 320 stores the decoded request.

The instruction storage circuit 330 stores an instruction corresponding to a request.

The instruction is stored in advance in the instruction cache 350, and an instruction corresponding to the request is stored in the instruction storage circuit 330 with reference to the instruction cache 350.

The location of the instruction corresponding to the request may be specified in advance, which will be disclosed in detail below.

The instruction storage circuit 330 includes a plurality of instruction queues 331, and each of the queues of the instruction queues 331 stores a sequence of instructions for a corresponding NDP kernel.

The instructions stored in the instruction queues 331 are provided to the computation circuit 340 to be used for computation operations.

The instruction storage circuit 330 further includes a request queue 332.

The request queue 332 stores a memory request corresponding to an NDP write request or an NDP read request. The memory request may be a write request or a read request.

The memory request stored in the request queue 332 are provided to the memory controller 220 to perform a corresponding read or write operation on the remote memory device 120.

For example, in FIG. 5, the write request for the write operation at S12 is stored in the request queue 332, and the instructions for the accumulation operation at S13 and the mean and standard deviation calculation operation at S14 are stored in respective queues of the instruction queues 331.

The computation circuit 340 performs a computation operation corresponding to an instruction provided from the instruction queues 331.

In this embodiment, an operation using a scalar data and a vector data, a square root operation, and the like are supported, but the kinds of operations are not limited thereto, and supported operations may be variously designed and changed according to embodiments.

Moreover, a specific circuit design according to an operation may be implemented using a conventionally known circuit technology, and accordingly a detailed description thereof will be omitted.

The instruction cache 350 is a circuit that stores in advance an instruction corresponding to a request.

The register file 370 includes a plurality of vector registers and scalar registers used in computation operations.

The register address translation circuit 360 serves to convert a logical address of a register used in the NDP kernel to a physical address of a register included in the register file 370.

The micro-context storage circuit 380 stores a micro-context table. The micro-context will be disclosed in detail below.

The filter circuit 210 shown in FIG. 6 may store the filter table for use in the filtering operation, and the NDP circuit 300 may store the NDP kernel table and the micro-context table to manage information necessary for the execution of the NDP kernel.

In this embodiment, the NDP kernel table is stored in the request decoder 310 and the micro-context table is stored in the micro-context storage circuit 380, but embodiments are not limited thereto.

FIG. 8A shows a filter table, FIG. 8B shows an NDP kernel table, and FIG. 8C shows a micro-context table.

The filter table includes a base address field, an address bound field, a pivot dimension field, a tensor shape field, an NDP kernel ID field, and a filter argument field.

The NDP kernel table includes an NDP kernel ID field, a code location field, a number of static registers field, a number of dynamic registers field, a number of requests per micro-context field, and a number of remaining micro-contexts field.

The micro context table includes an NDP kernel ID field, a pivot index field, a static register base ID field, and a number of remaining packets field.

The meaning of the fields included in each table will be described in detail below.

In order for an NDP kernel to be normally performed when an NDP request packet is transmitted, it is necessary to set information of the tables shown in FIGS. 8A, 8B, and 8C in advance.

In the present embodiment, before transmitting an NDP request packet to the memory expansion device 100, the GPU 11 transmits an NDP start packet to the memory expansion device 100 to set up the filter table, the NDP kernel table, and the micro-context table.

FIGS. 9A, 9B and 9C are software codes illustrating an example of an NDP kernel executed in the memory expansion device 100.

The illustrated NDP kernel corresponds to an accumulation operation at S13 and the mean and standard deviation calculation operation at S14 of FIG. 5.

The NDP kernel sequentially performs the initialization operation, a per-request function operation, and a completion operation.

FIG. 9A shows code for an initialization operation.

In the initialization operation, an operation for initializing a necessary register may be performed, and may be performed when an NDP start packet is received.

The code of FIG. 9A shows that the values of the vector registers v0 and v1 are initialized to 0, respectively.

FIG. 9B shows code for a per-request function operation. A per-request function operation is performed whenever an NDP request is received.

For example, in FIG. 5, the write operation at S12 and the accumulation operation at S13 are performed by transmitting n number of NDP request packets and therefore code of FIG. 9B may be executed n times.

In the code of FIG. 9B, REQDATA and REQADDR represent special purpose registers to store requested data and requested address, respectively.

The code of FIG. 9B shows an operation (VLS) of loading request data REQDATA into the vector register v2, an operation (VADD) of accumulating each element of the vector register v2 into the vector register v0, an operation (VFMA) to raise each element of the vector register v2 to a power of 2 (that is, to multiply each element of the vector register v2 by itself) and accumulate the result thereof into the vector register v1, and an operation (LS, VST) for storing the value of the vector register v2 at the requested address REQADDR.

FIG. 9C shows a completion operation, and the average and standard deviation calculation operation at S14 in FIG. 5 is performed.

In FIG. 9C, FILTERARG represents a special purpose register and is indicated as a filter argument.

First, the filter argument FILTERARG is stored in the register r1. In this case, the filter argument corresponds to an address to store the calculated mean and standard deviation.

The code of FIG. 9C represents multiplying each element of the registers v0 and v1 by 1/4. In this case, 1/4 is used because it is the inverse of 4, which is the number of row vectors that were accumulated in the illustrated example.

Thereafter, the mean value stored in the register v0 is stored at the address designated as the filter argument.

Next, the register v0 is updated by raising each element of the register v0 to a power of 2 (that is, by multiplying each element of the register v0 by itself using the VMUL operation), and a variance value obtained by subtracting (VSUB) the value of the register v1 from the value of the register v0 is stored in the register v1.

Thereafter, the value of the register v1 is updated by calculating the square root for each element of the register v1. As a result, the standard deviation is stored in the register v1.

Finally, the standard deviation in the register v1 is stored at the address which is a sum of a value stored in the register r1 as a filter argument and an offset 0x400.

Hereinafter, a technique for performing an NDP kernel of FIGS. 9A, 9B, and 9C in the memory expansion device 100 by transmitting a plurality of NDP write requests from the GPU 11 will be described.

In the present embodiment, the GPU 11 stores the two-dimensional tensor data A in the memory expansion device 100 through an NDP write request.

In the illustrated example, the tensor data is two-dimensional matrix data in which the number of rows X is 4 and the number of columns Y is 32. In the tensor element $A_{x,y}$, x represents a row number and y represents a column number.

In the illustrated example, the size of the tensor data is 256 bytes, so each tensor element $A_{x,y}$ of the tensor data has a size of 2 bytes.

In the illustrated example, the base address of the tensor data is 0x000 and the address bound is 0x100. That is, when the GPU 11 transmits a write request to an address range of 0x000 to 0x100, the filter circuit 210 may identify the request as an NDP write request.

In the illustrated example, the size of information that can be stored in the write request packet transmitted from the GPU 11 to the memory expansion device 100 is 32 bytes. Accordingly, one request packet can transmit a write request for 16 elements of the tensor data, and a total of 8 write request packets are transmitted to transmit the tensor data.

In this embodiment, when one row is transmitted, the transmission is divided into an upper column group and a lower column group, and a row vector corresponding to the upper column group is referred to as an upper row vector, and a row vector corresponding to the lower column group is referred to as a lower row vector.

Accordingly, In the illustrated example, the tensor elements included in one request packet correspond to either $A_{x,0}$ to $A_{x,15}$ or $A_{x,16}$ to $A_{x,31}$.

In this embodiment, a plurality of NDP requests for an upper row vector and a plurality of NDP requests for a lower row vector belong to different micro-contexts.

In the illustrated example, the code for the NDP kernel is stored from the cache memory address 0x300. In this case, the cache memory address indicates the address of the instruction cache 350.

As described above, REQDATA, REQADDR, and FILTERARG indicate special registers used by the NDP kernel, and these may be included in the register file 370.

In this embodiment, REQDATA represents a register that stores 32 bytes of write data, REQADDR represents a register that stores a write-requested address, and FILTERARG represents a register that stores filter arguments.

As described above, before performing the write operation, the GPU 11 transmits an NDP start packet to the memory expansion device 100 to set information in the table shown in FIG. 8.

The NDP start packet can be identified by the filter circuit 210 and the NDP circuit 300 by using a predetermined format, and information included in the NDP start packet can be decoded to set the information in the tables of FIGS. 8A, 8B, and 8C.

In this embodiment, the NDP start packet includes information related to base address, address bound, pivot dimension, tensor shape, filter argument, code location, number of static registers, and number of dynamic registers, and other information can be derived therefrom. A static register is allocated during an operation for a corresponding micro-context and a dynamic register is temporarily allocated during an operation for a per-request function.

FIGS. 10A, 10B, and 10C show information of a table set by an NDP start packet.

In response to receiving the NDP start packet, a row is added to the filter table of FIG. 10A in which the base address is 0x000, the address bound is 0x100, the pivot dimension is 0, the tensor shape is (4, 32), the NDP kernel ID is 0, and the filter argument is 0x200.

The tensor shape indicates that the tensor data is two-dimensional. And the pivot dimension 0 represents that mean and standard deviation calculation is performed column-wisely. If the pivot dimension is 1, row-wise mean and standard deviation calculation is performed. As described above, the filter argument indicates the address where the mean and standard deviation are to be stored.

In the NDP kernel table of FIG. 10B, a row is set in which the NDP kernel ID is 0, the code location is 0x300, the number of static registers per micro-context is 2, the number of dynamic registers is 2, the number of requests per micro-context is 4, and the number of remaining micro-contexts (that is, the number of micro-contexts that are configured and have not yet completed) is 2.

The number of requests per micro-context and the number of remaining micro-contexts are calculated and stored.

As described above, in the illustrated example, the request for 16 elements $A_{x,0}$ to $A_{x,15}$ corresponding to the lower row vector and the request for 16 elements $A_{x,16}$ to $A_{x,31}$ corresponding to the upper row vector correspond to respective micro-contexts.

Accordingly, the total number of micro-contexts becomes 2, and since there are a total of four rows in the tensor data, the number of requests per micro-context becomes 4.

In the micro-context table of FIG. 10C, two rows are stored. In one row, the NDP kernel ID is 0, the pivot index is 0, the static register base ID is 0, and the remaining number of packets is 4. In the other row, the NDP kernel ID is 0, the pivot index is 1, the static register base ID is 2, and the remaining number of packets is 4.

The pivot index is information that identifies a micro-context. The number of static registers in the NDP kernel table represents the static registers that can be allocated per micro-context.

In the micro-context table, the static register base ID corresponding to pivot index 0 is set to 0, and the static register base ID corresponding to pivot index 1 is set to 2.

As the NDP start packet is transmitted and necessary information is set in the table, the initialization code of the NDP kernel operates as shown in FIG. 9A.

Thereafter, in the illustrated example, the first write request packet for micro-context 0 is transmitted. In the illustrated example, the address of the first write request is 0x000.

The filter circuit 210 refers to the filter table, recognizes the write-requested address as a packet corresponding to the NDP kernel ID 0, and transmits the request to the NDP circuit 300.

The request decoder 310 decodes a transmitted request with reference to the NDP kernel table and the micro-context table and stores a decoded request in the request buffer 320.

An instruction corresponding to an NDP kernel ID is loaded from the instruction cache 350 with reference to the code location in the NDP kernel table and the instruction is stored in the instruction queue 331 and the request queue 332.

The instructions stored in the instruction queue 331 are transferred to the computation circuit 340 to perform an accumulation operation, and the write request stored in the request queue 332 is provided to the memory controller 220.

When the first write request packet is processed, the number of remaining packets corresponding to the NDP kernel ID 0 and pivot index 0 in the micro-context table is decreased by 1 and set to 3.

In the same way, the second and third write request packets for micro-context 0 can be processed.

In the illustrated example, the write address corresponding to the second write request packet is 0x040 and the write address corresponding to the third write request packet is 0x080.

When the second write request packet is processed, the remaining number of packets corresponding to the NDP kernel ID 0 and pivot index 0 in the micro-context table is decreased by 1 and set to 2.

When the third write request packet is processed, the number of remaining packets corresponding to the NDP kernel ID 0 and pivot index 0 in the micro-context table is decreased by 1 and set to 1.

Finally, the fourth write request packet for micro-context 0 can be processed, assuming that the write address is 0x0C0.

The fourth write request packet can also be processed in the same way, and the number of remaining packets corresponding to the NDP kernel ID 0 and pivot index 0 in the micro-context table is decreased by 1 and set to 0.

In response to the number of remaining packets for micro-context 0 being set to 0, the number of remaining micro-contexts corresponding to NDP kernel ID 0 in the NDP kernel table is decreased by 1 and set to 1.

Thereafter, four write request packets corresponding to micro-context 1 may be processed in a similar manner.

The per-request function operation of FIG. 9B is performed in response to each write request packet, and finally, the operation result using row vectors of tensor data is stored in two static registers.

The static register number included in the code of FIG. 9B represents a logical register number.

When a program is executed, the static register number included in the code for the program may be converted into a physical register number of a static register by referring to the logical number of the static register and a static register base ID of the micro-context table, and this operation may be performed by the register address translation circuit 360.

For example, in the illustrated example wherein the pivot index of the first and second micro-context are 0 and 1, respectively, and the static register base IDs of the first and second micro-context are 0 and 2, respectively (as shown in FIG. 10C), registers v0 and v1 of FIG. 9A represent physical registers v0 and v1 when performing the NDP kernel operation corresponding to the pivot index 0, and registers v0 and v1 of FIG. 9A represent physical registers v2 and v3 when performing the NDP kernel operation corresponding to the pivot index 1.

In the present embodiment, the completion operation of FIG. 9C is performed once per micro-context and in the illustrated example is performed after four request packets are transmitted.

Accordingly, for micro-context 0 the completion operation code of FIG. 9C calculates, for each column in the upper column group, the average and standard deviation corresponding to the lower row vector by using the calculated values for the lower row vector and stores the average and standard deviation corresponding to the lower row vector at a designated address of the remote memory device 120.

In addition, for micro-context 1 the completion operation code of FIG. 9C calculates, for each column in the lower column group, the average and standard deviation corresponding to the upper row vector by using the calculated value of the upper row vector and stores the average and standard deviation corresponding to the upper row vector at a designated address of the remote memory device 120.

Figure 11:
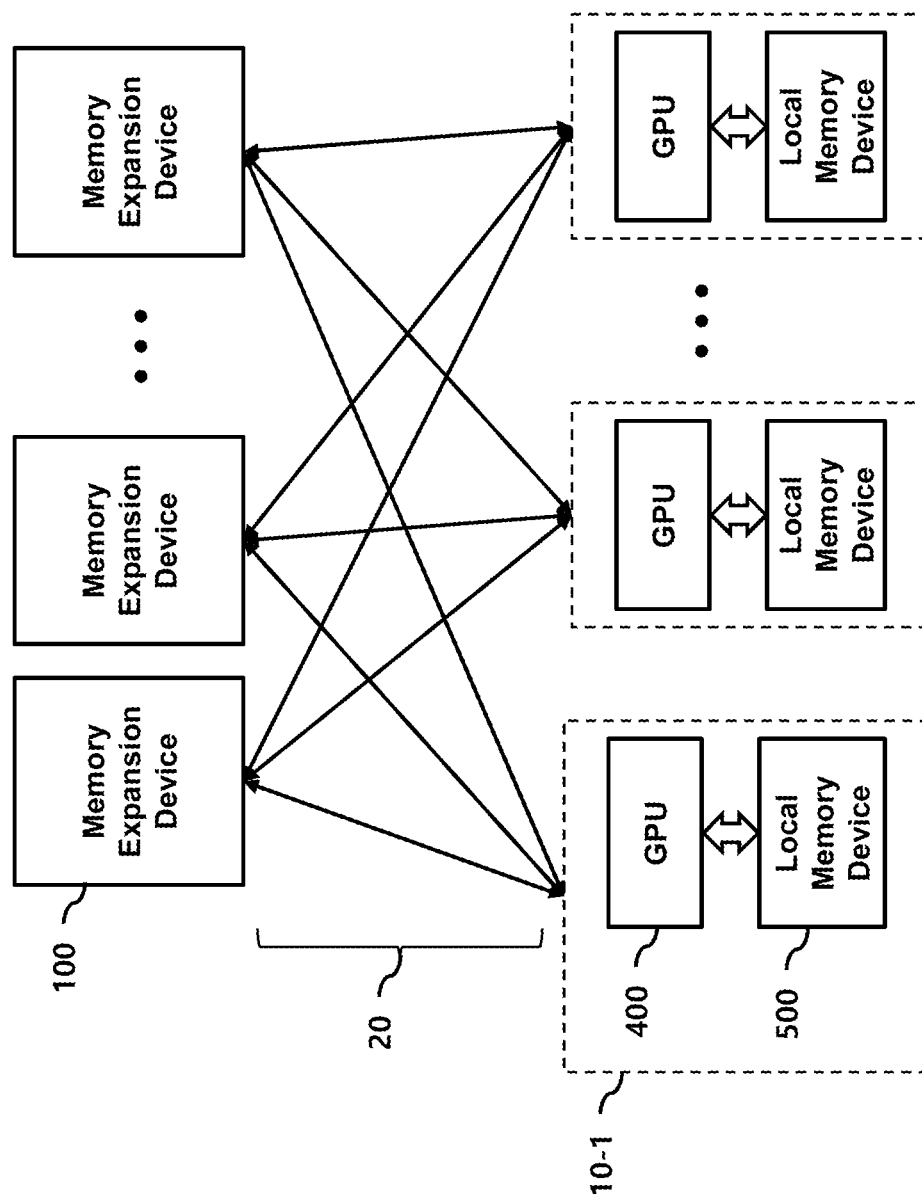
FIG. 11 illustrates an accelerator system according to another embodiment of the present disclosure.

FIG. 11 is a block diagram illustrating an accelerator system 2000 according to another embodiment of the present disclosure.

In the embodiment of FIG. 11, the graphic processing device 10-1 performs the NDP function.

The NDP function performed by the graphic processing device 10-1 and the NDP function performed by the memory expansion device 100 are independent.

Accordingly, in the present embodiment, the memory expansion device 100 may also perform the NDP function as in the embodiment of FIG. 1.

The graphic processing unit 10-1 includes a GPU 400 and a local memory device 500, and in the illustrated embodiment, the GPU 400 performs an NDP function together with performing operations typically performed by GPUs, such as the operations previously described for the GPU 11 of FIG. 1.

In this case, since the processing of the NDP request generated by the GPU 400 in the memory expansion device 100 is the same as described above, a description thereof will be omitted.

Figure 12:
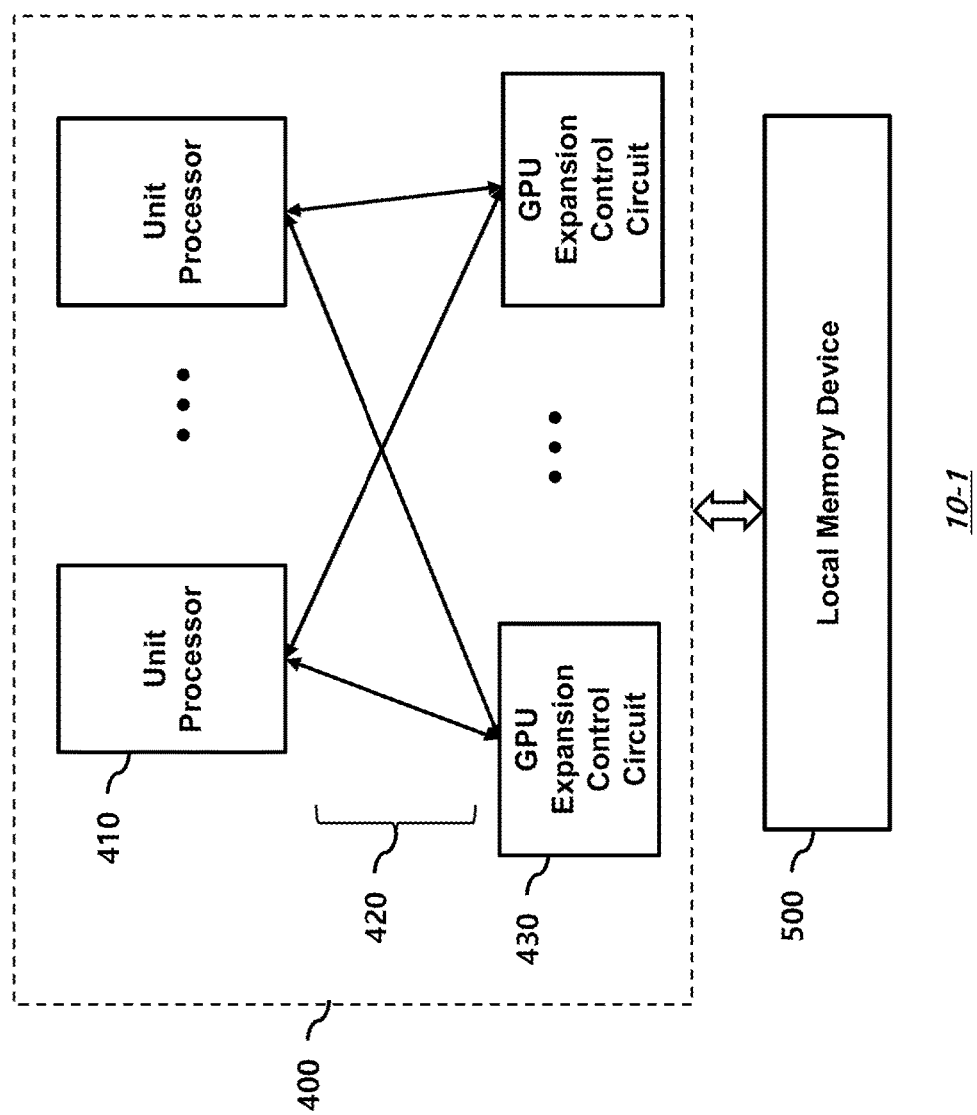
FIG. 12 illustrates a graphic processing device according to the embodiment of FIG. 11.

FIG. 12 is a block diagram illustrating the graphic processing device 10-1 in detail.

The GPU 400 includes a plurality of unit processors 410, a plurality of GPU expansion control circuits 430, and an interconnect network 420 connecting the plurality of unit processors 410 and the plurality of GPU expansion control circuits 430. Hereinafter, a GPU expansion control circuit 430 may be referred to as a host expansion control circuit 430.

The unit processor 410 is generally a sub-processor included in the GPU 400, and for example, a streaming multiprocessor (SM) may correspond to the unit processor 410 of the present embodiment.

The interconnect network 420 may connect a plurality of unit processors 410 and a plurality of host expansion control circuits 430 in a fully connected manner.

Figure 13:
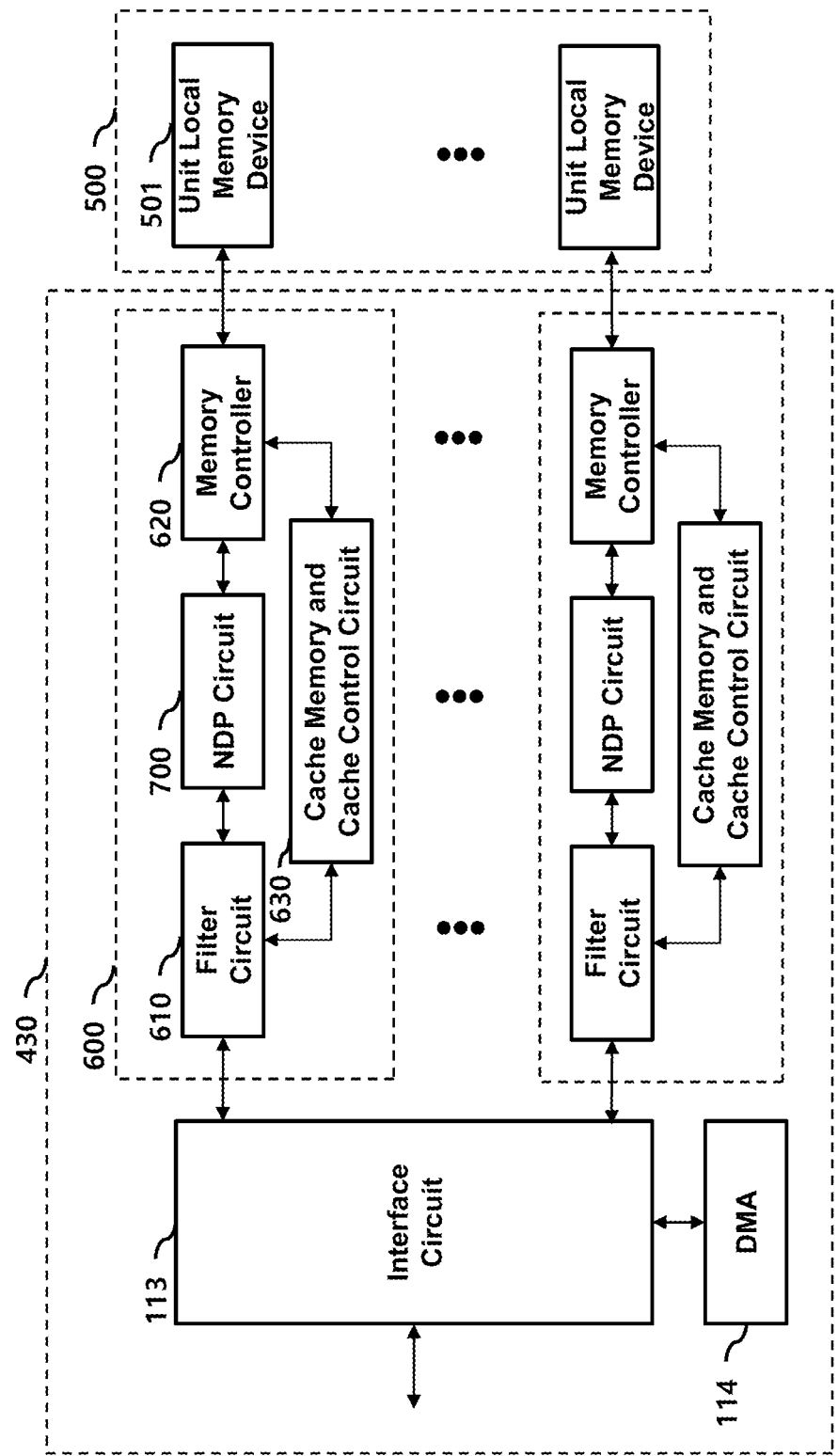
FIG. 13 illustrates a unit processor according to the embodiment of FIG. 11.

FIG. 13 is a block diagram illustrating the host expansion control circuit 430 and the local memory device 500.

The host expansion control circuit 430 corresponds to the expansion control circuit 110 of FIG. 6, and its detailed configuration and functions are similar thereto.

That is, the host expansion control circuit 430 includes an interface circuit 113, a DMA circuit 114, and a plurality of GPU NDP request control circuits 600. Hereinafter, the GPU NDP request control circuit 600 may be referred to as a host NDP request control circuit 600.

The interface circuit 113, the DMA circuit 114, and the plurality of host NDP request control circuits 600 correspond to the interface circuit 111, the DMA circuit 114, and the plurality of NDP request control circuits 200 of FIG. 6, respectively. The operation of the corresponding elements are substantially the same except as noted below.

The local memory device 500 includes a plurality of unit local memory devices 501.

In the illustrated embodiment, one GPU NDP request control circuit 600 is connected to one unit local memory device 501, but embodiments are not limited thereto.

Address ranges of each of the GPU NDP request control circuits 600 are assigned according to the corresponding unit local memory device 501, and the interface circuit 113 uses the address of the input request packet to determine the corresponding GPU NDP request control circuit 600 and forwards the input request packet to the corresponding GPU NDP request control circuit 600.

The interface circuit 113 transmits and receives packets between the plurality of GPU NDP request control circuits 600 and the interconnect network 420.

The DMA circuit 114 may generate a request packet via DMA technology and may be coupled to the interface circuit 113.

For example, the request packet generated by the DMA circuit 114 may have the same structure as the request packet generated by the unit processor 410.

Accordingly, a request generated by the DMA circuit 114 of one host expansion control circuit 430 may be processed internally, may be transmitted to another host expansion control circuit 430. or may be transmitted to a memory expansion device 100.

The GPU NDP request control circuit 600 is connected between the interface circuit 113 and the unit local memory device 120 to perform a memory read/write operation and an NDP operation.

The GPU NDP request control circuit 600 corresponds to the NDP request control circuit 200 of FIG. 6 and has substantially the same configuration and operation.

The GPU NDP request control circuit 600 includes a filter circuit 610, an NDP circuit 700, and a memory controller 620, which respectively correspond to the filter circuit 210, the NDP circuit 300, and the memory controller 220 in FIG. 6. Operations of the corresponding elements are substantially the same.

Accordingly, the NDP circuit 700 has the same configuration as that disclosed with reference to FIGS. 7 to 10 and the operations thereof are also the same.

Accordingly, details of the configuration and operation of the GPU NDP request control circuit 600 that are the same as that of the NDP request control circuit 200 of FIG. 2 will be omitted.

GPUs typically include cache memory inside them. To this end, in the present embodiment, a cache memory circuit 630 including cache memory and control circuits is further included between the filter circuit 610 and the memory controller 620.

Accordingly, the normal request filtered by the filter circuit 610 may be processed according to a memory hierarchy including the cache memory 630 as the upper level and the unit local memory device 501 as the lower level.

Processing a read or write request in such a memory hierarchy is well known to those skilled in the art, and a detailed description thereof will therefore be omitted.

In the present embodiment, the unit processor 410 shown in FIG. 12 may generate an NDP request and process it using the GPU expansion control circuit 430 and the local memory device 500.

Since the method of processing the NDP request by the GPU expansion control circuit 430 itself is the same as the method of processing the NDP request using the expansion control circuit 110 in the memory expansion device 100, a detailed description thereof will be omitted.

Figure 14:
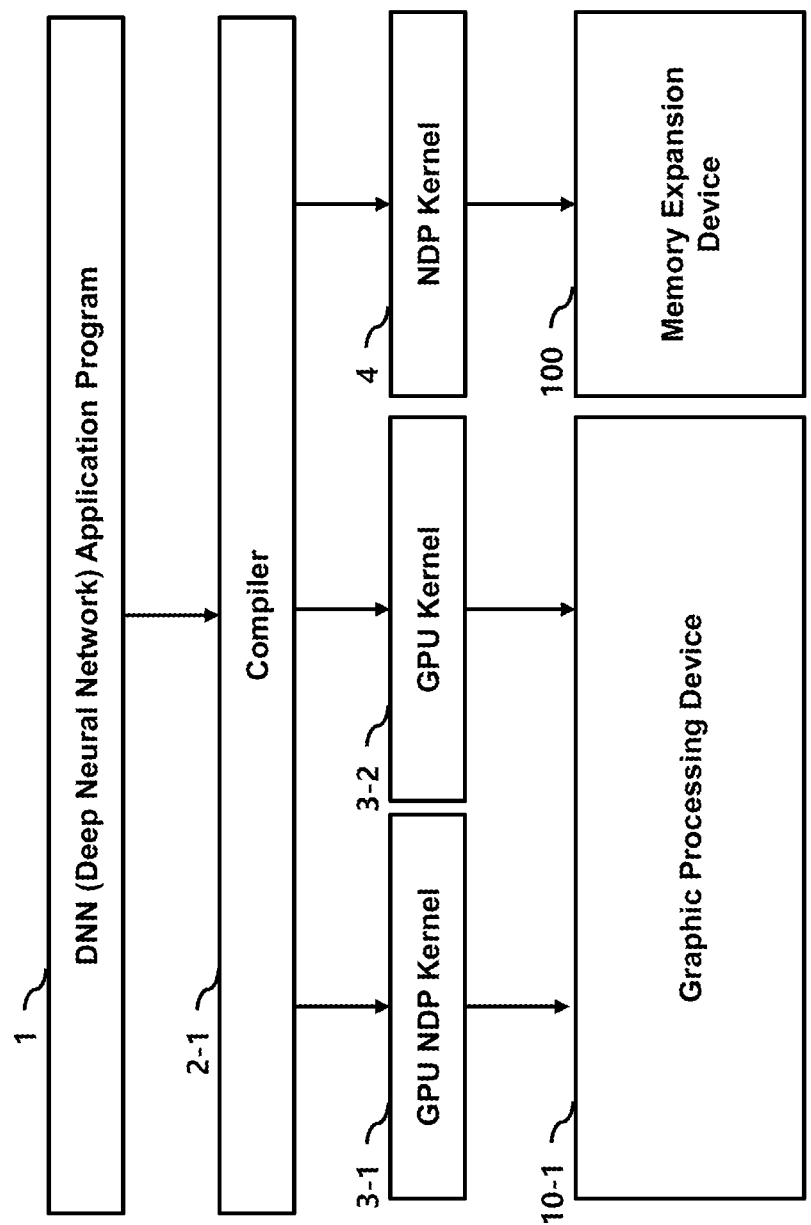
FIG. 14 illustrates a control process for a graphic processing device and a memory expansion device according to the embodiment of FIG. 11.

FIG. 14 illustrates a control process for the graphic processing device 10-1 and the memory expansion device 100 according to another embodiment of the present disclosure.

FIG. 14 corresponds to an embodiment in which both the graphic processing device 10-1 and the memory expansion device 100 perform the NDP function.

In FIG. 14, the compiler 2-1 is different from FIG. 3 in that it additionally supports the NDP function performed inside the GPU 400, and for this purpose, the compiler 2-1 generates a GPU kernel 3-1 processed in the graphic processing unit 10-1 and the GPU NDP kernel 3-2.

A read or write request to the graphic processing unit 10-1 or the memory expansion unit 100 may occur while the graphic processing unit 10-1 executes the GPU kernel 3-1, and the graphic processing device 10-1 or the memory expansion device 100 may respectively perform the corresponding GPU NDP kernel 3-2 or NDP kernel 4.

The request generated by the GPU kernel 3-1 and the GPU NDP kernel 3-2 or the NDP kernel 4 corresponding thereto may be predetermined by the compiler 2-1.

FIG. 15 illustrates a control process of a deep neural network operation performed in the graphic processing device 10-1.

FIG. 15 corresponds to FIG. 5.

That is, the unit processor 410, the NDP circuit 700, and the unit local memory device 501 of FIG. 15 correspond to the GPU 11, the NDP circuit 300, and the remote memory device 120 of FIG. 5.

Because the operation of the process shown in FIG. 15 is substantially the same as that illustrated in FIG. 5, except that in FIG. 15 the host expansion control circuit 430 of FIG. 12 performs the operations that were performed in FIG. 5 by the expansion control circuit 110 of the memory expansion device 100, a repetitive description will be omitted.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A host device comprising:
   a unit processor configured to generate a near data processing (NDP) request;
   a host expansion control circuit configured to receive the NDP request; and
   a local memory device configured to store data corresponding to the NDP request according to control by the host expansion control circuit,
   wherein in response to the NDP request, the host expansion control circuit performs:
      a request processing operation to perform a memory operation corresponding to the NDP request on the local memory device, the memory operation including a read operation or a write operation, and
   a computation operation using the data corresponding to the NDP request,
   wherein the host expansion control circuit comprises:
      one or more host NDP request control circuits; and
      an interface circuit configured to receive the NDP request, select a host NDP request control circuit from among the one or more host NDP request control circuits according to an address of the NDP request, and provide the NDP request to the selected host NDP control circuit, wherein the selected host NDP request control circuit is configured to control the request processing operation and the computation operation corresponding to the NDP request, wherein the selected host NDP request control circuit comprises:
- a filter circuit configured to identify the NDP request;
- an NDP circuit configured to produce a request for the request processing operation and to perform the computation operation according to the NDP request identified at the filter circuit; and
- a memory controller configured to control the local memory device according to the request for the request processing operation produced by the NDP circuit, wherein the host NDP request control circuit further includes a cache memory connected between the filter circuit and the memory controller, wherein the host expansion control circuit is further configured to receive a normal request that does not require a computation operation, and wherein the filter circuit is further configured to identify the normal request and to bypass the identified normal request to the memory controller via the cache memory.

2. The host device of claim 1, wherein the filter circuit stores a table including address information, and wherein the filter circuit identifies the NDP request and the normal request with reference to the address information.

3. The host device of claim 1, wherein the NDP circuit comprise:
- a computation circuit configured to perform a computation operation corresponding to the NDP request;
- an instruction storage circuit configured to store an instruction for the computation operation and a request for the request processing operation; and
- a register file including a plurality of registers for the computation operation.

4. The host device of claim 3, wherein the NDP circuit further comprise an instruction cache to store a plurality of instructions, and wherein the instruction storage circuit stores an instruction received from the instruction cache corresponding to the NDP request.

5. The host device of claim 4, wherein the NDP circuit further comprises a request decoder to perform a decoding operation by using information included in the NDP request, and wherein the request decoder includes an NDP kernel table that associatively stores the NDP request and instruction cache address corresponding to the NDP request.

6. The host device of claim 5, wherein the NDP circuit further comprises:
- a micro-context storage circuit configured to associatively store the NDP request and a base address for one or more registers allocated for use in the computation operation; and
- a register address translation circuit configured to generate register address used for the computation operation with reference to the base address.

7. The host device of claim 1, wherein the host expansion control circuit further includes a direct memory access (DMA) circuit connected to the interface circuit and configured to generate an NDP request, and wherein the interface circuit is configured to provide the NDP request generated by the DMA circuit to the NDP request control circuit or to a device external to the host expansion control circuit.

8. An accelerator system comprising:
- a host device including a unit processor;
- a memory expansion device; and
- an interconnect circuit configured to connect the host device and the memory expansion device, wherein the host device among the plurality of memory expansion devices includes:
- a host expansion control circuit configured to receive a near data processing (NDP) request provided to the unit processor; and
- a local memory device configured to store data corresponding to the NDP request according to control by the host expansion control circuit, and wherein in response to the NDP request, the host expansion control circuit performs:
- a request processing operation to perform a memory operation corresponding to the NDP request on the local memory device, the memory operation including a read operation or a write operation, and
- a computation operation using the data corresponding to the NDP request, wherein the host expansion control circuit comprises:
- one or more host NDP request control circuits; and
- an interface circuit configured to receive the NDP request, select a host NDP request control circuit from among the one or more host NDP request control circuits according to an address of the NDP request, and provide the NDP request to the selected host NDP control circuit, and wherein the selected host NDP request control circuit configured to control the request processing operation and the computation operation corresponding to the NDP request, wherein the selected host NDP request control circuit comprises:
- a filter circuit configured to identify the NDP request;
- an NDP circuit configured to produce a request for the request processing operation and to perform the computation operation according to the NDP request identified at the filter circuit; and
- a memory controller configured to control the local memory device according to the request for the request processing operation produced by the NDP circuit, wherein the host NDP request control circuit includes a cache memory connected between the filter circuit and the memory controller, wherein the host expansion control circuit is further configured to receive a normal request that does not require a computation operation, and wherein the filter circuit is further configured to identify the normal request and to bypass the identified normal request to the memory controller via the cache memory controller.

9. The accelerator system of claim 8, wherein the filter circuit stores a table including address information, and wherein the filter circuit identifies the NDP request and the normal request with reference to the address information.

10. The accelerator system of claim 8, wherein the NDP circuit comprise:
- a computation circuit configured to perform a computation operation corresponding to the NDP request;
- an instruction storage circuit configured to store an instruction for the computation operation and a request for the request processing operation; and
- a register file including a plurality of registers for the computation operation.

11. The accelerator system of claim 10, wherein the NDP circuit further comprise an instruction cache to store a plurality of instructions, and wherein the instruction storage circuit stores an instruction received from the instruction cache corresponding to the NDP request.

12. The accelerator system of claim 11, wherein the NDP circuit further comprises a request decoder to perform a decoding operation by using information included in the NDP request, and
wherein the request decoder includes an NDP kernel table that associatively stores the NDP request and instruction cache address corresponding to the NDP request.

13. The accelerator system of claim 12, wherein the NDP circuit further comprises:
a micro-context storage circuit configured to associatively store the NDP request and a base address for one or more registers allocated for use in the computation operation; and
a register address translation circuit configured to generate register address used for the computation operation with reference to the base address.

14. The accelerator system of claim 8, wherein the host expansion control circuit further includes a direct memory access (DMA) circuit connected to the interface circuit and configured to generate an NDP request, and
wherein the interface circuit is configured to provide the NDP request generated at by DMA circuit to the NDP request control circuit or to a device external to the host expansion control circuit.

* * * * *